United States Patent
Kelsey et al.

(10) Patent No.: US 11,030,812 B2
(45) Date of Patent: Jun. 8, 2021

(54) AUGMENTED REALITY SYSTEM USING ENHANCED MODELS

(71) Applicant: The Boeing Company, Chicago, IL (US)

(72) Inventors: William David Kelsey, Issaquah, WA (US); Brian Dale Laughlin, Wichita, KS (US)

(73) Assignee: The Boeing Company, Chicago, IL (US)

(*) Notice: Subject to any disclaimer, the term of this patent is extended or adjusted under 35 U.S.C. 154(b) by 25 days.

(21) Appl. No.: 16/237,841

(22) Filed: Jan. 2, 2019

(65) Prior Publication Data
US 2020/0211286 A1 Jul. 2, 2020

(51) Int. Cl.
| | |
|---|---|
| *G06T 19/00* | (2011.01) |
| *G06K 9/00* | (2006.01) |
| *G06K 9/20* | (2006.01) |
| *G05D 1/00* | (2006.01) |
| *G05D 1/10* | (2006.01) |

(52) U.S. Cl.
CPC ........ *G06T 19/006* (2013.01); *G06K 9/00637* (2013.01); *G06K 9/2081* (2013.01); *G05D 1/0027* (2013.01); *G05D 1/0044* (2013.01); *G05D 1/101* (2013.01); *G05D 2201/0207* (2013.01); *G06T 2210/36* (2013.01)

(58) Field of Classification Search
CPC . G06T 19/006; G06K 9/00637; G06K 9/2081
See application file for complete search history.

(56) References Cited

U.S. PATENT DOCUMENTS 8,902,254 B1 * 12/2014 Laughlin .............. G06T 19/006
    345/633
2010/0268409 A1 * 10/2010 Vian ..................... G05D 1/104
    701/24

(Continued)

OTHER PUBLICATIONS

Cho, Peter, and Noah Snavely. "3D Exploitation of 2D Imagery." vol. 20, No. 1, 2013, Lincoln Laboratory Journal (2013), pp. 105-137.*

(Continued)

*Primary Examiner* — Sarah Lhymn
(74) *Attorney, Agent, or Firm* — Yee & Associates, P.C.

(57) ABSTRACT

A method, apparatus, and system for visualizing information. An augmented reality system comprises a computer system and a visualizer in the computer system. The computer system is in communication with unmanned vehicles using communications links. The visualizer system receives images of a physical object from the unmanned vehicles moving relative to the physical object and receive scan data for a region of the physical object from the unmanned vehicles. The visualizer creates an enhanced model of the physical object using the images and the scan data. The region of the physical object in the enhanced model has a greater amount of detail than the other regions of the physical object. The visualizer sends information to a portable computing device that is displayable by the portable computing device on a live view of the physical object. The information is identified using the enhanced model of the physical object.

29 Claims, 13 Drawing Sheets

(56) References Cited

U.S. PATENT DOCUMENTS

| | | | | |
|---|---|---|---|---|
| 2015/0084989 | A1* | 3/2015 | Laughlin | G06T 19/20 345/633 |
| 2015/0145954 | A1* | 5/2015 | Pulleti | B64C 39/02 348/46 |
| 2015/0346722 | A1* | 12/2015 | Herz | G05D 1/0038 701/2 |
| 2016/0307373 | A1* | 10/2016 | Dean | G06T 19/006 |
| 2018/0182187 | A1* | 6/2018 | Tong | G06N 20/00 |
| 2019/0221191 | A1* | 7/2019 | Chhipa | G09G 5/373 |
| 2020/0049946 | A1* | 2/2020 | Peuhkurinen | G02B 27/0093 |
| 2020/0082629 | A1* | 3/2020 | Jones | G06T 7/73 |

OTHER PUBLICATIONS

Lamb, "Four Steps for Making an Excellent 3D Model with a Drone", DroneDeploy, Mar. 24, 2016, accessed Nov. 5, 2018, 10 pages.

Falkingham, "Trying all the free Photogrammetry!," Sep. 14, 2016, accessed Oct. 29, 2018, 15 Pages.

Smith, "Creating 3D Models from Photos,", An Fstoppers Original, May 31, 2018, accessed Oct. 29, 2018, 7 pages.

Extended European Search Report, dated Apr. 29, 2020, regarding Application No. 19218606.2, 11 pages.

Shang et al., "Real-time 3D Reconstruction on Construction Site using SLAM and UAV," Cornell University Library, Dec. 19, 2019, 10 pages.

\* cited by examiner

AUGMENTED REALITY SYSTEM USING ENHANCED MODELS

BACKGROUND INFORMATION

1. Field

The present disclosure relates generally to an improved augmented reality system and, in particular, to a method, apparatus, and system for augmenting a view of a large object.

2. Background

Augmented reality involves an interactive experience with a real-world environment that is augmented by information from a computer system. The information is displayed on a live view of the real-world environment seen through a portable computing device. The information is displayed on the live view in a manner that provides descriptions or indicators about objects in the live view to a user. This information is also referred to as augmented reality information. In other cases, the augmented reality information is displayed on the live view of the real-world environment in a manner that is seamlessly interwoven such that the information perceived as part of the real-world environment as seen through the portable computing device.

A simultaneous location and mapping process uses anchors to localize the portable computing device in the ambient environment. An anchor is a feature point which is a distinctive location on a physical object or environment near the physical object. The anchor is used to correspond a model of the physical object to the physical object in the real-world as seen in the live view of the physical object.

Sometimes, as the distance of the augmented reality device from the anchor increases, the accuracy with which the augmented reality device in displaying the augmented reality information on the live view of the physical object decreases.

For example, a distance of more than five meters may result in an undesired level of accuracy for the augmented reality device to display the augmented reality information in positions on or proximate to the physical object.

As the size of the physical object increases, the number of anchors needed for desired accuracy in displaying information to augment a live view of the physical object may be greater than possible or feasible for some physical objects. For example, augmenting a live view of large objects, such as an aircraft, an office building, or a dam, can be more difficult than desired. The accuracy may not be as precise as desired and use of processing resources may be greater than desired.

Therefore, it would be desirable to have a method and apparatus that take into account at least some of the issues discussed above, as well as other possible issues. For example, it would be desirable to have a method and apparatus that overcome a technical problem with displaying information to augment a live view of a physical object.

SUMMARY

An embodiment of the present disclosure provides an augmented reality system, which comprises a group of unmanned aerial vehicles, a computer system, and a portable computing device. The group of unmanned vehicles operates to move relative to a physical object, generate images of the physical object, generate scan data describing points in space for the for a region of the physical object. The computer system is in communication with the group of unmanned vehicles using communications links and operates to receive images of a physical object from the group of unmanned vehicles moving relative to the physical object; receive scan data for the region of the physical object from a number of unmanned vehicles in the group of unmanned vehicles moving relative to the physical object; and create an enhanced model of the physical object using the images and the scan data, wherein the region of the physical object in the enhanced model has a greater amount of detail than the other regions of the physical object in the enhanced model. The portable computing device operates to localize to the physical object using the enhanced model and displays information on a live view of the physical object seen through the portable computing device. The information is identified using the enhanced model of the physical object.

Another embodiment of the present disclosure provides an augmented reality system, which comprises a computer system and a visualizer in the computer system. The computer system is in communication with a group of unmanned vehicles using communications links during operation of the computer system and operation of the group of unmanned vehicles. The visualizer operates to receive images of a physical object from the group of unmanned vehicles moving relative to the physical object and receive scan data for a region of the physical object from a number of unmanned vehicles in the group of unmanned vehicles moving relative to the physical object. The visualizer operates to create an enhanced model of the physical object using the images and the scan data. The region of the physical object in the enhanced model has a greater amount of detail than the other regions of the physical object in the enhanced model. The visualizer sends information to a portable computing device. The information is displayable by the portable computing device on a live view of the physical object seen through the portable computing device. The information is identified using the enhanced model of the physical object.

Yet another embodiment of the present disclosure provides a method for visualizing information on a live view of a physical object. Images of a physical object are received by computer system from group of unmanned vehicles moving relative to the physical object. The computer system is in communications with the group of unmanned vehicles using communications links. Scan data is received by the computer system for a region of the physical object. An enhanced model of the physical object is created by the computer system using the images and the scan data. The region in the enhanced model has greater detail than the other regions of the physical object in the enhanced model. At least a portion of the enhanced model is sent by the computer system to a portable computing device, wherein the portable computing device localizes to the physical object using at least the portion of the enhanced model. Information that is displayable by the portable computing device is sent to the portable computing device by the computer system. The portable computing device displays information on the live view of the physical object seen through the portable computing device, and the information is identified using the enhanced model of the physical object.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

Figure 1:
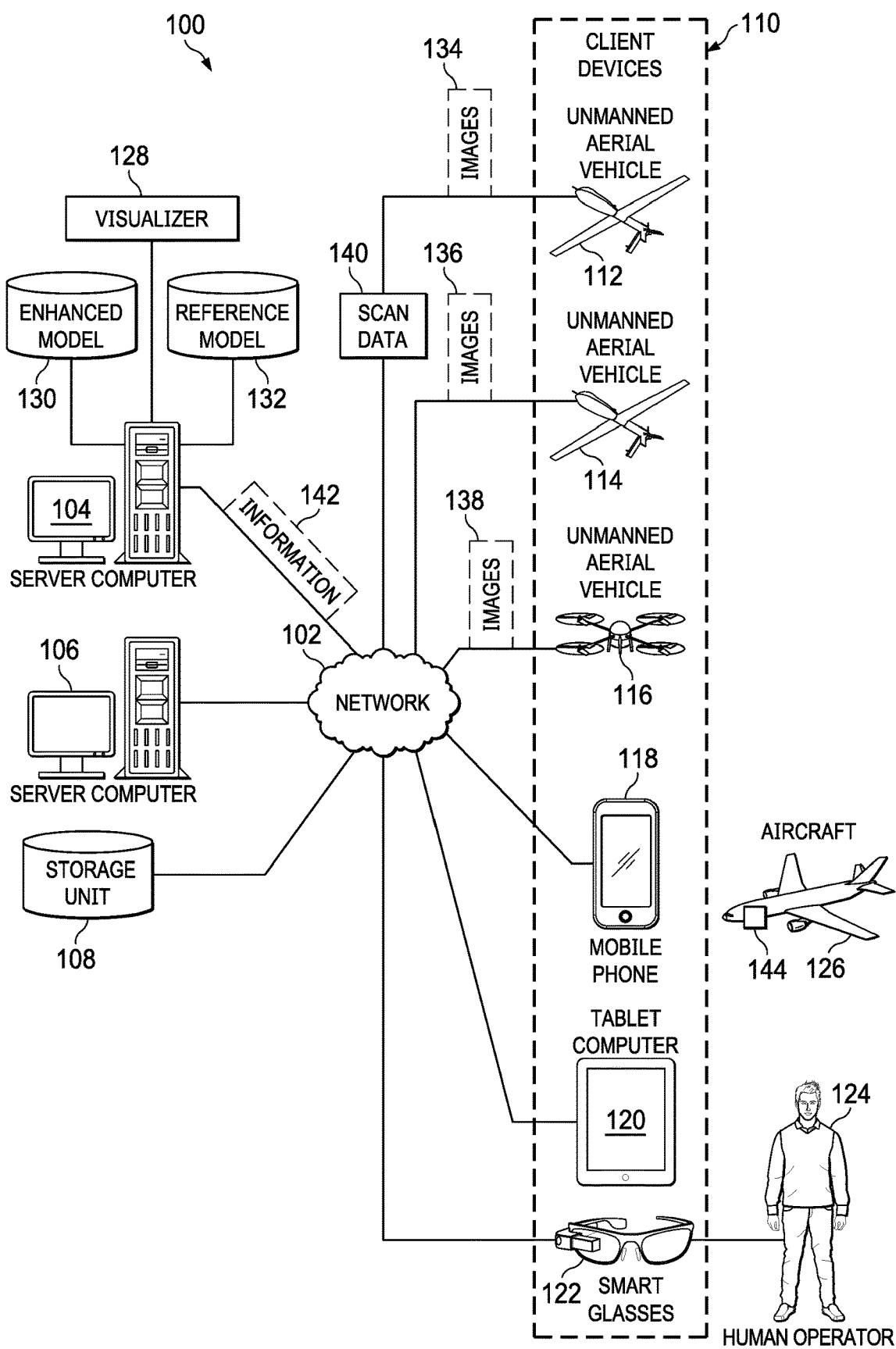
FIG. 1 is an illustration of a pictorial representation of a network of data processing systems in which illustrative embodiments may be implemented.

The illustrative embodiments recognize and take into account one or more different considerations. For example, the illustrative embodiments recognize and take into account that physical objects, such as an aircraft, a building, a field, or some other large physical object, can make displaying information to augment views of these physical objects more difficult than desired. The illustrative embodiments recognize and take into account that one solution involves generating a model of the physical object using one or more computing devices in addition to a portable computing device operated by a human operator. The illustrative embodiments recognize and take into account that these additional computing devices can provide additional information used to at least one of create a model of the physical object, localize the portable computing device, or perform other operations with respect to the physical object.

For example, the illustrative embodiments recognize and take into account that portable computing devices, such as unmanned vehicles, can be used to generate data used to create a model of the physical object. These unmanned vehicles can include at least one of an unmanned aerial vehicle, an unmanned ground vehicle, or an unmanned aquatic vehicle. Further, the data gathered by the portable computing device can be used to generate additional data, which is used in conjunction with the data generated by the unmanned vehicles to generate the model.

As used herein, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

Further, the illustrative embodiments recognize and take into account that scanning an entire physical object to create a model of the physical object can be more resource-intensive than desired as the size of the physical object increases. For example, the illustrative embodiments recognize and take into account that generating scan data with a three-dimensional scanner for creating a point cloud of a physical object, such as aircraft or a building, can require more bandwidth, processing power, storage, or other computing resources than desired. These three-dimensional scanners can include a laser scanner, a lidar system, an infrared scanner, or some other type of scanning system.

The illustrative embodiments recognize and take into account that images can be used to create a model of the physical object. The illustrative embodiments recognize and take into account that the amount of detail in the model of the physical object can be lower than the detail from a scan used to generate point clouds. The illustrative embodiments recognize and take into account, however, that a three-dimensional scanner can be used to generate scan data for one or more regions of interest in which a higher level of detail is desired. As a result, at least one of the amount of bandwidth, processing resources, storage, or other computing resources can be reduced by using two types of data to generate the model of the physical object.

Accordingly, the illustrative embodiments provide a method, apparatus, and system for visualizing information on a live view of a physical object. In one illustrative example, a computer system receives images of a physical object from unmanned vehicles moving relative to the physical object. The computer system is in communications with the unmanned vehicles using communications links. The computer system receives scan data for the region of the physical object. The computer system creates an enhanced model of the physical object using the images and the scan data, wherein the region in the enhanced model has greater detail than the other regions of the physical object in the enhanced model. The computer system sends at least a portion of the enhanced model to a portable computing device, wherein the portable computing device localizes to the physical object using at least the portion of the enhanced model. The computer system also sends information that is displayable by the portable computing device. The portable computing device displays information on the live view of the physical object seen through the portable computing device, wherein the information is identified using the enhanced model of the physical object.

With reference now to the figures and, in particular, with reference to FIG. 1, an illustration of a pictorial representation of a network of data processing systems is depicted in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as tethered communications links or wireless communications links. The wireless communications links can be established through at least one of air, a vacuum, or water.

The tethered communications links can include at least one of wires or fiber optic cables. As depicted, tethered communications links can be bulkier or limit the distance that unmanned vehicles can travel. These types of communications links can provide increased security as compared to wireless communications links. These tethered communications links can also include intermittent connections that can occur when the unmanned aerial vehicle returns and comes in contact with a charging or base station.

In another example, intermittent connections can be intermittent wireless connections that can be affected by line sight, distance, or other factors. With this type of connection, a first unmanned aerial vehicle can lose a wireless connection. In this case another an unmanned aerial vehicle can move or position itself relative to first unmanned aerial vehicle to provide a bridge connection to server computer 104.

In the depicted example, server computer 104 and server computer 106 connect to network 102 along with storage unit 108. In addition, client devices 110 connect to network 102. As depicted, client devices 110 include unmanned aerial vehicle 112, unmanned aerial vehicle 114, and unmanned aerial vehicle 116. As depicted, unmanned aerial vehicle 112 and unmanned aerial vehicle 114 are fixed wing aircraft. As depicted, unmanned aerial vehicle 116 is a quadcopter. Client devices 110 can be, for example, computers, workstations, or network computers. In the depicted example, server computer 104 provides information, such as boot files, operating system images, and applications to client devices 110. Further, client devices 110 can also include other types of client devices such as mobile phone 118, tablet computer 120, and smart glasses 122. In this illustrative example, server computer 104, server computer 106, storage unit 108, and client devices 110 are network devices that connect to network 102 in which network 102 is the communications media for these network devices. Some or all of client devices 110 may form an Internet-of-things (IoT) in which these physical devices can connect to network 102 and exchange information with each other over network 102.

Client devices 110 are clients to server computer 104 in this example. Network data processing system 100 may include additional server computers, client computers, and other devices not shown. Client devices 110 connect to network 102 utilizing at least one of tethered connections or wireless connections.

Program code located in network data processing system 100 can be stored on a computer-recordable storage medium and downloaded to a data processing system or other device for use. For example, the program code can be stored on a computer-recordable storage medium on server computer 104 and downloaded to client devices 110 over network 102 for use on client devices 110. In some implementations, a processor retrieves program code and executes instructions to initiate, perform, or control certain operations descried herein.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational, and other computer systems that route data and messages. Of course, network data processing system 100 also may be implemented using a number of different types of networks. For example, network 102 can be comprised of at least one of the Internet, an intranet, a local area network (LAN), a metropolitan area network (MAN), or a wide area network (WAN). As another example, network 102 can be a mesh network or an ad-hoc point-to-point mobile edge network. FIG. 1 is intended as an example, and not as an architectural limitation for the different illustrative embodiments.

As used herein, "a number of," when used with reference to items, means one or more items. For example, "a number of different types of networks" is one or more different types of networks.

In the illustrative example, human operator 124 uses smart glasses 122 to view a physical object in the form of aircraft 126. In this illustrative example, human operator 124 sees a live view of aircraft 126 using smart glasses 122. This live view can be overlaid with information 142 displayed on the live view as seen using smart glasses 122 to form an augmented reality view of aircraft 126.

In this illustrative example, smart glasses 122 is in communication with visualizer 128 located in server computer 104. Visualizer 128 provides information 142 from reference model 132 that is displayed to overlay the live view of aircraft 126 seen through smart glasses 122. Smart glasses 122 localizes itself with aircraft 126 using enhanced model 130.

In this illustrative example, enhanced model 130 is a three-dimensional model or map of aircraft 126. In other examples, the model or map may be of a different physical object. As depicted, unmanned aerial vehicle 112 generates images 134 of aircraft 126 while flying relative to aircraft 126. Unmanned aerial vehicle 112 sends images 134 to visualizer 128. Unmanned aerial vehicle 114 also generates and sends images 136 of aircraft 126 to visualizer 128. Unmanned aerial vehicle 116 generates and sends images 138 of aircraft 126 to visualizer 128.

Visualizer 128 uses these images from the unmanned aerial vehicles to generate a model of aircraft 126. The model is a three-dimensional model of the surface of aircraft 126 and can be generated using currently available techniques for generating models from images. These techniques perform three-dimensional reconstruction from multiple images to create a three-dimensional model of aircraft 126. In this manner, aircraft 126 can be mapped using these images.

In the illustrative examples, region 144 of aircraft 126 may not be visible in images 134, images 136, or images 138. As a result, the model of aircraft 126 will have a hole or missing section for region 144. In other cases, region 144 may be included in the images.

In this example, human operator 124 may need a more detailed model of region 144 of aircraft 126 than can be provided using images 134, images 136, and images 138. In other words, region 144 can be present in the model generated from the images, but the detail of region 144 may be missing or may not be as great as desired. As a result, information 142 displayed in region 144 may not be as accurate as desired.

In this instance, one or more of the unmanned aerial vehicles can be used to generate a more detailed model of that region. For example, unmanned aerial vehicle 112 can also generate scan data 140 and send scan data 140 to visualizer 128.

In this depicted example, scan data 140 is used to generate a point cloud for region 144 of aircraft 126. This point cloud can then be used to modify region 144 in the model of aircraft 126 to form enhanced model 130. Enhanced model 130 includes region 144 of aircraft 126 in which increased detail is present as compared to other regions of aircraft 126 in enhanced model 130.

In this illustrative example, unmanned aerial vehicle 112, unmanned aerial vehicle 114, and unmanned aerial vehicle 116 provide two types of data, images and scan data, used to generate enhanced model 130. Enhanced model 130 can be used to localize smart glasses 122. The localization can be performed using simultaneous localization and mapping (SLAM) processes.

By using unmanned aerial vehicles, time and effort spent to operate smart glasses 122, to generate images, scan data, or some combination thereof to create a model. Human operator 124 can focus on performing tasks or other operations with respect to aircraft 126.

The reduction in time and effort avoided by operator 124 can be accomplished in the illustrative example by using at least one of unmanned aerial vehicle 112, unmanned aerial vehicle 114, or unmanned aerial vehicle 116. These unmanned aerial vehicles can provide images 134, images 136, images 138, and scan data 140 processed by visualizer 128 to generate enhanced model 130.

These operations performed by the unmanned aerial vehicles can be performed prior to human operator 124 viewing aircraft 126. In other words, human operator 124 does not need to perform any operations to generate data for creating enhanced model 130 when the unmanned aerial vehicles provide the data needed ahead of time. The unmanned aerial vehicles can also generate images 134, images 136, images 138, and scan data 140 while human operator 124 views aircraft 126.

The additional images and scan data, taken in real-time or beforehand, can be used to provide at least one of increased accuracy of enhanced model 130 or detail or granularity in other sections in addition to section 144.

Further, the use of these unmanned aerial vehicle can increase the amount of data generated for aircraft 126 in a manner that increases granularity of information in the enhanced model 130. In this illustrative example, one of unmanned aerial vehicles 112, 114, or 116 may capture images from various viewpoints to add to or enhance images used for creating enhanced model 130. For example, unmanned aerial vehicle 112 can generate anchors from the images and scan data 140. Anchors, as used herein, represent common features on aircraft 126 and reference model 132 that are used to align reference model 132 to aircraft 126. Unmanned aerial vehicle 112 can move away from aircraft 126 a sufficient distance to capture the common features upon which an anchor is to be placed, in a single frame of reference. As such, the number of anchors needed to align a model to the aircraft 126 may be reduced. In other words, enhanced model 130 can be better aligned with aircraft 126. The unmanned aerial vehicles can generate anchors from the images and scan data 140.

Further, the accuracy of enhanced model 130 used to determine the position features on aircraft 126 can increase through the use of the unmanned aerial vehicles. As depicted, the unmanned aerial vehicles generate images and scan data from different viewpoints or locations. A feature on aircraft 126 such as a window on aircraft 126 can be captured in at least one of images 134, images 136, images 138, or scan data 140. These different viewpoints allow for increased accuracy in identifying the position of the window when displaying information relating to the window from reference model 132.

For example, triangulation can be performed using these images and the scan data from different positions of the unmanned aerial vehicles. For example, computer vision triangulation can be used by visualizer 128. Computer vision triangulation is a process determines a point in three-dimensional space given its projection on two or more images of the point. As more images are present different viewpoints are present, the accuracy can be of a particular point on aircraft 126 is increased in the illustrative example. As another example, stereophotogrammetry can be used to determine three-dimensional portraits for points on object such as aircraft 126. This technique can be performed using images 134, images 136, images 138 taken from different positions by the unmanned aerial vehicles.

Human operator 124 using smart glasses 122 can approach aircraft 126 in a manner such that the anchors are visible to human operator 124 using smart glasses 122. The location of human operator 124 can be determined using enhanced model 130 and the anchors seen through smart glasses 122. As human operator 124 approaches aircraft 126, other locations on aircraft 126 can be seen by human operator 124 through smart glasses 120 that do not include the anchors in enhanced model 130 or reference model 132. The accuracy in displaying information from reference model 132 can be maintained by reference points that are identified starting from when the anchor is initially viewed by human operator 124 using smart glasses 122. These reference points can be features or elements on aircraft 126.

This type of model creation reduces time and effort needed to create a model of a physical object. This type of model creation can be especially useful for large objects such as aircraft 126, a building, a field, a city block, a dam, or other types of physical objects that can result in undesired time and processor resource use in creating the model for displaying information for an augmented reality view of a physical object.

Further, by processing images for the physical object and scan data for one or more regions of the physical object, the amount of computing resources needed to process data is reduced. For example, the use of processor resources to generate point clouds from scan data and create a model of the physical object from the point clouds is reduced since the point clouds are used only for a region of the physical object rather than the entire physical object. As another example, stored resources may be decreased because the size of the enhanced model is smaller than a model that is generated entirely using scan data.

Figure 2:
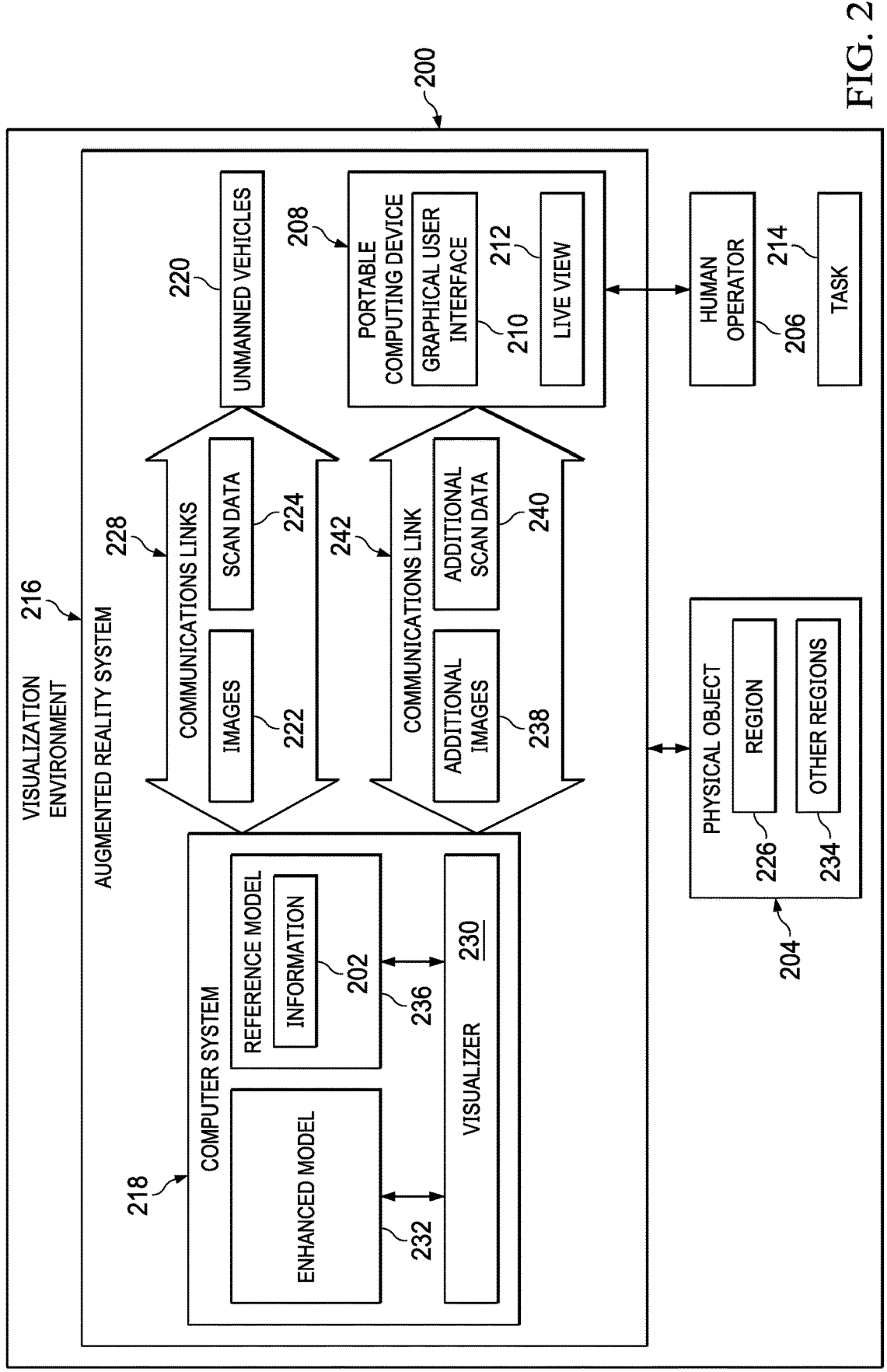
FIG. 2 is an illustration of a block diagram of an augmented reality environment in accordance with an illustrative embodiment.

With reference now to FIG. 2, an illustration of a block diagram of an augmented reality environment is depicted in accordance with an illustrative embodiment. In this illustrative example, visualization environment 200 includes components that can be implemented in hardware such as the hardware shown in network data processing system 100 in FIG. 1.

As depicted, visualization environment 200 is an environment in which information 202 for physical object 204 can be visualized by human operator 206 using portable computing device 208. In this illustrative example, physical object 204 is selected from a group comprising an airplane, a building, a bridge, a dam, a vehicle, a field, a lake, a mountain, an engine, a fuselage section, a runway, and other types of objects. In this illustrative example, information 202 is selected from at least one of task information, an assembly, a video, an indication of a non-conformance, a work order, an exploded view of an assembly, a schematic diagram, or other information about physical object 204.

Portable computing device 208 can take a number of different forms. For example, portable computing device 208 can be selected from a group comprising smart glasses, a mobile phone, a tablet computer, an augmented reality contact lens, a virtual retinal display, a head-mounted display, and other types of devices suitable for providing an augmented reality view of physical object 204.

As depicted, human operator 206 can view information 202 displayed in graphical user interface 210 on live view 212 of physical object 204 to aid human operator 206 in performing task 214. In this illustrative example, task 214 is selected from a group comprising a design task, a manufacturing task, an inspection task, a maintenance task, a testing task, a task using physical object 204, and other suitable tasks in which live view 212 of physical object 204 is augmented with information 202 to aid in performing task 214 on physical object 204.

In this illustrative example, augmented reality system 216 includes a number of different components. As depicted, augmented reality system 216 includes computer system 218, a group of unmanned vehicles 220, and portable computing device 208.

As used herein, "a group of," when used with reference to items, means one or more items. For example, "a group of unmanned vehicles 220" is one or more of unmanned vehicles 220.

Computer system 218 is a physical hardware system and includes one or more data processing systems. When more than one data processing system is present in computer system 218, those data processing systems are in communication with each other using a communications medium. The communications medium can be a network. The data processing systems can be selected from at least one of a computer, a server computer, a tablet computer, or some other suitable data processing system.

In this illustrative example, the group of unmanned vehicles 220 can take a number of different forms. For example, the group of unmanned vehicles 220 can be selected from at least one of an unmanned aerial vehicle, a drone, an unmanned ground vehicle, or an unmanned water vehicle. The group of unmanned vehicles 220 operate to move relative to physical object 204.

The group of unmanned vehicles 220 generates images 222 of physical object 204 and generates scan data 224 describing points in space for region 226 of physical object 204. In this illustrative example, the group of unmanned vehicles 220 can generate scan data 224 by having a number of unmanned vehicles 220 in the group of unmanned vehicles 220 scan physical object 204. In other words, all or a subset of the group of unmanned vehicles 220 can generate scan data 224.

In the illustrative example, the group of unmanned vehicles 220 operates to generate images 222 and scan data 224 while human operator 206 views live view 212 of physical object 204 through portable computing device 208. For example, unmanned vehicles 220 can generate images 222 and scan data 224 prior to human operator 206 viewing live view 212 of physical object 204. In this example, unmanned vehicles 220 can continue to generate images 222 and scan data 224 while human operator 206 views physical object 204. In other examples, the generation of images 222 and scan data 224 can occur as human operator 206 sees live view 212 of physical object 204 through portable computing device 208.

As depicted, computer system 218 is in communication with the group of unmanned vehicles 220 using communications links 228. Communications links 228 can be selected from at least one of a tethered communications link or a wireless communications link. Tethered communications links include, for example, at least one of a wire, a wire cable, a coaxial cable, an optical fiber, or an optical cable. Wireless communications links can be selected from at least one of radio frequency signals, optical signals, electromagnetic radiation, microwaves, or other suitable media.

In this illustrative example, visualizer 230 is located in computer system 218. During operation, visualizer 230 in computer system 218 receives images 222 of physical object 204 from the group of unmanned vehicles 220 moving relative to physical object 204.

Visualizer 230 receives scan data 224 for region 226 of physical object 204 from a number of unmanned vehicles 220 in the group of unmanned vehicles 220 moving relative to physical object 204. Visualizer 230 creates enhanced model 232 of physical object 204 using images 222 and scan data 224.

Region 226 of physical object 204 in enhanced model 232 has a greater amount of detail than other regions 234 of physical object 204 in enhanced model 232. For example, scan data 224 can provide a greater resolution of region 226 as compared to images 222. As another example, scan data 224 can also provide increased regularity in region 226 of enhanced model 232 of physical object 204. Three-dimensional scanners, such as laser scanners, actively direct radiation towards physical object 204. The responses from the radiation energy can increase brightness, reduce shadows, and provide other features occurring with increased regularity as compared to a passive sensor system such as a camera. The three-dimensional scanners can also use other types of radiation to perform scans such as electrical, optical, infrared, other portions of the light spectrum, an electromagnetic spectrum, an acoustic spectrum, or other types of scanning radiation. As yet another example, the three-dimensional scanner may include pressure sensing devices employing interference scan.

With the different types of scans that can be performed using three-dimensional scanners, detail for characteristics such as opacity, reflectiveness, hardness, color, hue, or other characteristics can be determined more easily or accurately as compared to using images from cameras. These characteristics can be used to asses physical object 204. For example, the health, remaining life, suitability for use, or other characteristics of physical object 204 can be determined. In the illustrative example, different types of sensors can be used to determine different types of nonconformances. For example, light detected by a camera can be used to identify non-conformances in structures in physical object 204. These nonconformances can be identified by comparing a structure in enhanced model 232 generated from images detected by the camera to reference model 202, such as a computer-aided design model or a prior enhanced model generated of physical object 204. An ultrasound sensor can be used to identify voids in a composite structure in physical object 204. As yet another example, a magnetic sensor can be used to identify inconsistencies in a metal structure in physical object 204.

These characteristics can be used by visualizer 230 to classify properties such as nonconformances. These nonconformances can include at least one of: a scratch, a dent, a crack, missing paint, a missing fastener, or other types of nonconformances.

As depicted, portable computing device 208 localizes to physical object 204 using enhanced model 232 and displays information 202 on live view 212 of physical object 204 seen through portable computing device 208.

In this illustrative example, information 202 is identified using enhanced model 232 of physical object 204. For example, information 202 can be located in reference model 236. Reference model 236 is a model of physical object 204. Corresponding locations in enhanced model 232 and reference model 236 can be correlated to have the same coordinate system using image registration. Further, the localization of portable computing device 208 to physical object 204 can use the same coordinate system.

Reference model 236 can take a number of different forms. For example, reference model 236 can be a computer-aided design model of physical object 204. In another example, reference model 236 can be a model of physical object 204 created from images 222 and scan data 224 at a prior time. For example, reference model 236 can be a model of physical object 204 at a prior state of manufacturing. As another example, reference model 236 can be a model of physical object 204 generated at a prior time. This type of reference model 236 can be used for comparison with enhanced model 232 to determine if changes have occurred. These changes can be non-conformances, changes in configuration, or other types of changes.

In this illustrative example, visualizer 230 in computer system 218 controls the group of unmanned vehicles 220 to move relative to physical object 204 and generate images 222 of physical object 204 and scan data 224 describing points in space for region 226 of physical object 204.

In other illustrative examples, the group of unmanned vehicles 220 can operate autonomously without using input from visualizer 230 in computer system 218. For example, each of the group of unmanned vehicles 220 can include program code that identifies physical object 204 as an object for which images 222 and scan data 224 can be generated.

In one illustrative example, human operator 206 using portable computing device 208 can also contribute data to generate enhanced model 232. For example, portable computing device 208 can generate at least one of additional images 238 or additional scan data 240. Portable computing device 208 is in communication with computer system 218 using communications link 242. Communications link 242 can be selected from at least one of radio frequency signals, optical signals, electromagnetic radiation, microwaves, or other suitable media.

As depicted, portable computing device 208 can send at least one of additional images 238 or additional scan data 240 to visualizer 230 in computer system 218. In creating enhanced model 232 of physical object 204, visualizer 230 can create enhanced model 232 of physical object 204 using images 222, additional images 238, scan data 224, and additional scan data 240.

Visualizer 230 can be implemented in software, hardware, firmware, or a combination thereof. When software is used, the operations performed by visualizer 230 can be implemented in program code configured to run on hardware, such as a processor unit. When firmware is used, the operations performed by visualizer 230 can be implemented in program code and data and stored in persistent memory to run on a processor unit. When hardware is employed, the hardware can include circuits that operate to perform the operations in visualizer 230.

In the illustrative examples, the hardware can take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components, excluding a human being. For example, the processes can be implemented as circuits in organic semiconductors.

In one illustrative example, one or more technical solutions are present that overcome a technical problem with displaying information to augment a live view of a physical object in a manner the reduces an amount of processing resources used as compared to currently used techniques that generate point clouds of the physical object.

As a result, one or more technical solutions can provide a technical effect of reducing the amount of processing resources used to create a model of a physical object using two types of data. In the illustrative example, images and scan data are used to reduce the amount of processing resources used as compared to current techniques that only use point clouds.

With respect to large physical objects, such a commercial airplane, a dam, and a cruise ship, obtaining three-dimensional models of these types of physical objects can be more difficult as the distance increases because of the range of currently used three-dimensional scanners. Additionally, as the distance increases, the stereoscopic separation that is present with scans decrease and may not provide the separation desired. Thus, the use of unmanned vehicles to generate the two types of data, images and scan data provide a number of technical effects. For example, the ability to zoom in to see greater detail for one or more regions is present. Additionally, the use of unmanned vehicles allows those vehicles to be moved to positions that provide greater separation.

Computer system 218 can be configured to perform at least one of the steps, operations, or actions described in the different illustrative examples using software, hardware, firmware, or a combination thereof. As a result, computer system 218 operates as a special purpose computer system in which visualizer 230 in computer system 218 enables generating enhanced model 232 using two types of data that uses less processing resources as compare to current processes. In particular, visualizer 230 transforms computer system 218 into a special purpose computer system as compared to currently available general computer systems that do not have visualizer 230.

Figure 3:
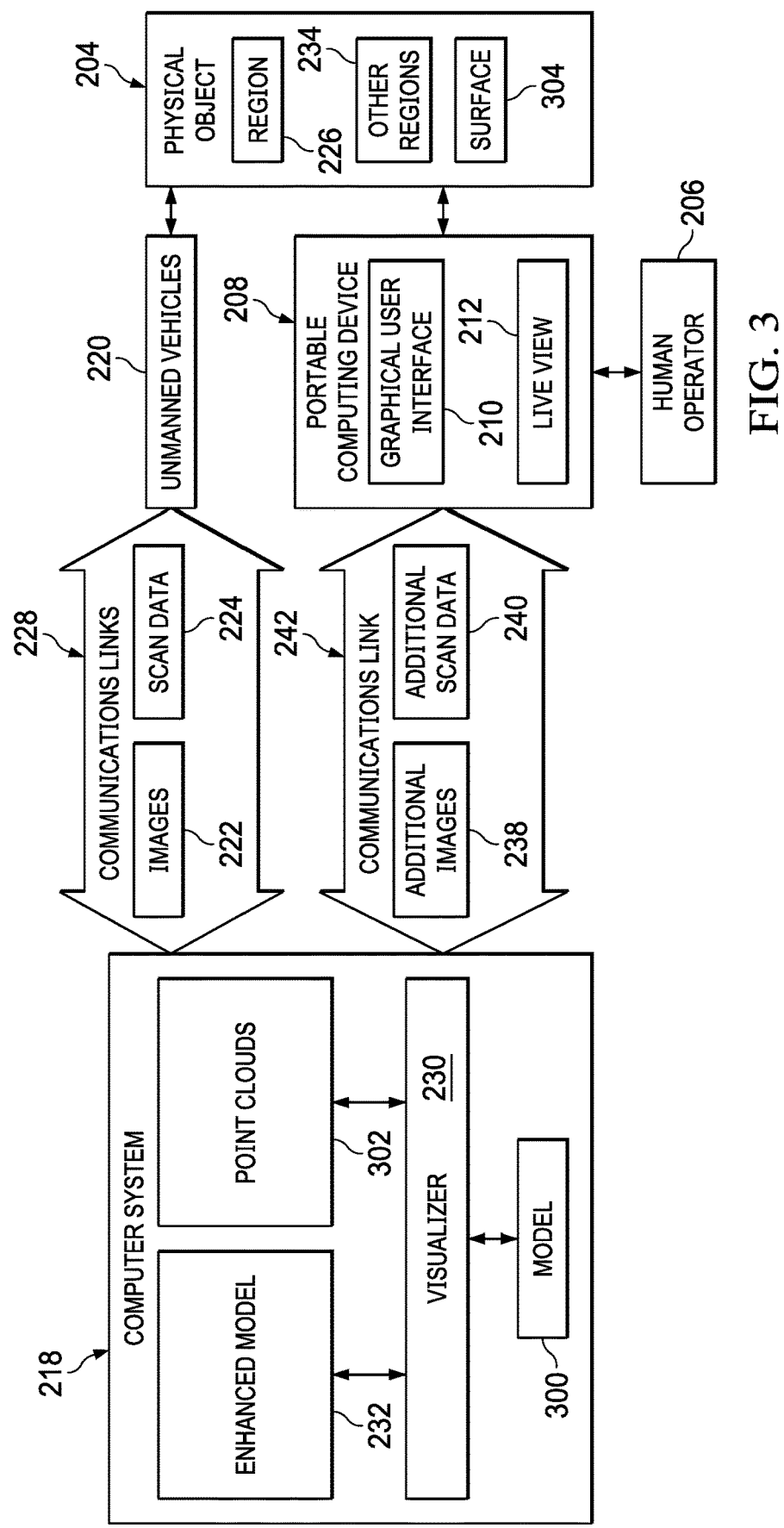
FIG. 3 is an illustration of a block diagram showing creation of an enhanced model in accordance with an illustrative embodiment.

With reference next to FIG. 3, an illustration of a block diagram showing creation of an enhanced model is depicted in accordance with an illustrative embodiment. In the illustrative examples, the same reference numeral may be used in more than one figure. This reuse of a reference numeral in different figures represents the same element in the different figures.

In this illustrative example, visualizer 230 creates enhanced model 232 using images 222 received from a group of unmanned vehicles 220 and scan data 224 received from a number of unmanned vehicles 220.

In creating enhanced model 232 of physical object 204, visualizer 230 creates model 300 of physical object 204 using images 222. Visualizer 230 can identify physical object 204 in images 222 using an object recognition process. Visualizer 230 can employ three-dimensional reconstruction of physical object 204.

This three-dimensional reconstruction can be performed using an identification of physical object 204 from images 222 to create model 300, which is a three-dimensional model of physical object 204. Model 300 can be a computer-aided design (CAD) model, a computer-aided engineering (CAE) model, or some other suitable type of model.

In this depicted example, images 222 are images of physical object 204 from different viewpoints. In other words, the number of unmanned vehicles 220 generates images 222 of physical object 204 from different positions. A position is a location of an unmanned vehicle in a three-dimensional space and includes an orientation of the unmanned vehicle.

Scan data 224 is generated by a number of unmanned vehicles 220 for region 226. Scan data 224 describes points in space for region 226 of physical object 204. Region 226 can be missing from images 222 or can be a region in which greater detail is desired than can be provided using images 222.

Visualizer 230 also creates a number of point clouds 302 from scan data 224 generated by the number of unmanned vehicles 220 in the group of unmanned vehicles 220. The number of point clouds 302 describes surface 304 of physical object 204 in region 226. Visualizer 230 modifies model 300 of physical object 204 using the number of point clouds 302 to form enhanced model 232.

For example, the number of point clouds 302 can be converted to a polygon mesh model, a triangle mesh model, a non-uniform rational basis spline (NURBS) surface model, or a computer-aided model through a currently used process that is commonly referred to as surface reconstruction.

Further, enhanced model 232 can also be created using data received from portable computing device 208. For example, additional scan data 240 can be received for region 226 from portable computing device 208 and used to generate a point cloud in the number of point clouds 302. As another example, additional images 238 can be received from portable computing device 208 and used in generating model 300.

Figure 4:
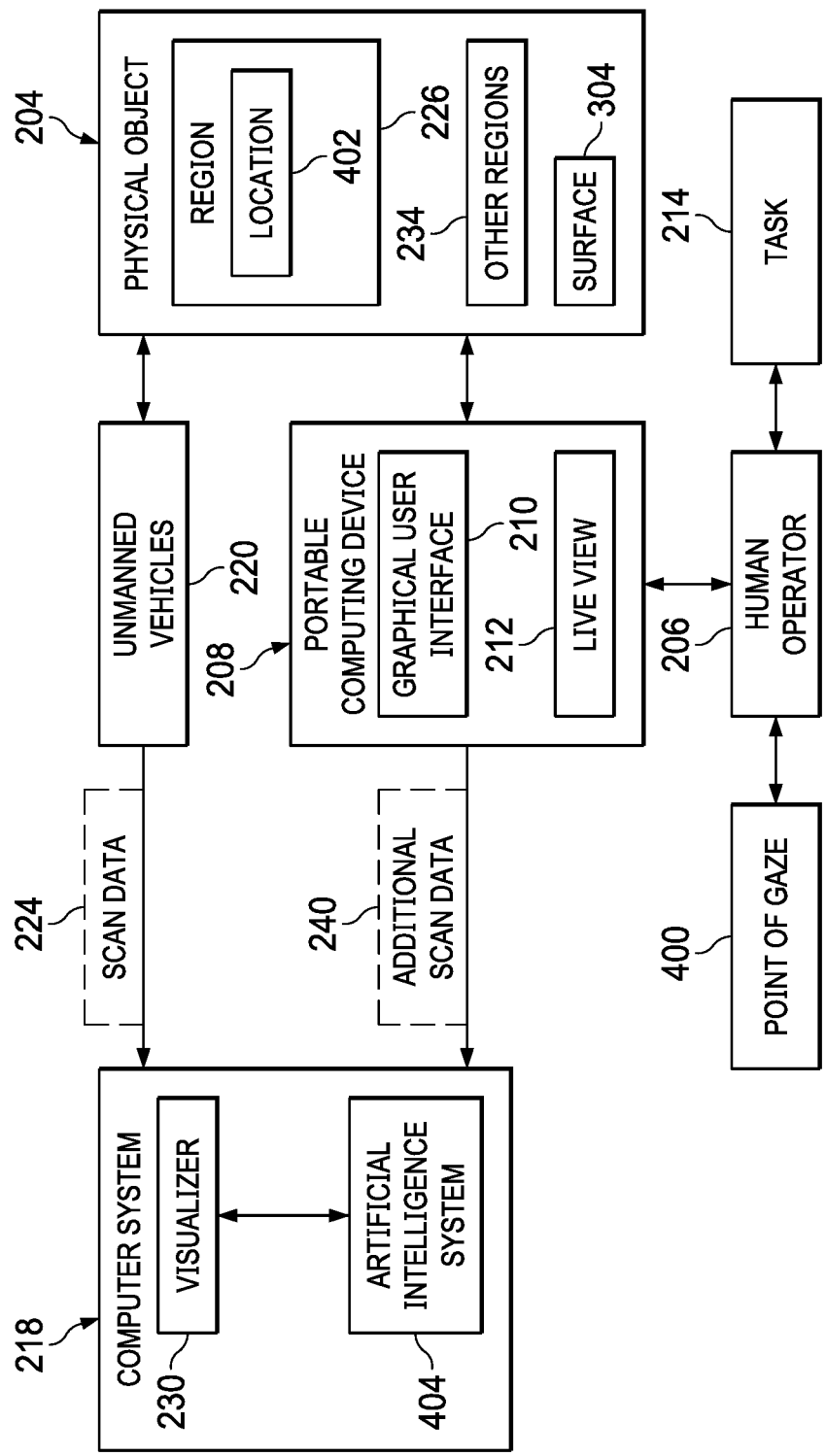
FIG. 4 is an illustration of a block diagram showing selection of a region of a physical object in accordance with an illustrative embodiment.

FIG. 4 is an illustration of a block diagram showing a selection of a region of a physical object as depicted in accordance with an illustrative embodiment. In this illustrative example, visualizer 230 in computer system 218 selects region 226 of physical object 204 and controls a number of unmanned vehicles 220 in a group of unmanned vehicles 220 to generate scan data 224 of region 226 of physical object 204.

Region 226 can be selected in a number of different ways. For example, visualizer 230 can select region 226 of physical object 204 based on point of gaze 400 of human operator 206 using portable computing device 208. Point of gaze 400 is where human operator 206 is looking. In this illustrative example, portable computing device 208 can measure point of gaze 400 of human operator 206. The location of point of gaze 400 on physical object 204 can be used to determine region 226 on physical object 204.

In another illustrative example, visualizer 230 can select region 226 of physical object 204 based on location 402 for task 214 performed by human operator 206 using portable computing device 208. In this example, location 402 is encompassed by region 226.

With the identification of region 226, visualizer 230 can control the number of unmanned vehicles 220 to generate scan data 224. With scan data 224, region 226 of physical object 204 in enhanced model 232 has greater detail than other regions 234 of physical object 204 in enhanced model 232.

Further, artificial intelligence system 404 can aid in identifying region 226. For example, artificial intelligence system 404 can predict where human operator 206 will look. In other words, artificial intelligence system 404 can predict point of gaze 400 for human operator 206 and can direct the number of unmanned vehicles 220 to a predicted region on physical object 204 to generate scan data 224 and generate or update enhanced model 232. This generation or updating of enhanced model 232 can occur prior to human operator 206 changing point of gaze 400 to the predicted region.

Additionally, portable computing device 208 can generate and send additional scan data 240 to visualizer 230. In this illustrative example, additional scan data 240 can be for point of gaze 400.

The illustration of visualization environment 200 and the different components in visualization environment 200 in FIGS. 2-4 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, one or more portable computing devices and one or more human operators using the one or more portable computer devices can be present in visualization environment in addition to or in place of portable computing device 208. As another example, although enhanced model 232 has been depicted in the illustrative example as being used in augmented reality system 216, enhanced model 232 can be used in other mixed reality systems such as a virtual reality system. In a virtual reality system, enhanced model 232 can be used in training to perform actions on physical object 204. For example, human operator 206 can view enhanced model 232 of physical object 204 and train to perform task 214 on physical object 204. In another example, one or more regions in addition to or in place of region 226 can be scanned to created scan data for those one or more regions.

For example, reference model 236 can be updated using scan data 224 instead of creating enhanced model 232. In this manner, reference model 236 can be updated to reflect changes to physical object 204 that have occurred over time.

In this example, region 226 of physical object 204 can be scanned and the corresponding region in reference model 236 can be updated. The update to reference model 236 can address changes to physical object 204 that occur over time. Further, scan data 224 can also be used to increase the detail in reference model 236 in region 226 to more accurately reflect the temporal changes of physical object 204 in reference model 236 at the same level of detail.

In one illustrative example, a structure in physical object 204 can be reshaped, deform, or otherwise change over time. If the structure that has changed is to be replaced, the current configuration with the changed structure is used to identify or fabricate the replacement structures. Reference model 236 without the change cannot be used to replace the structure. In this case, region 226 in physical object 204 in which the structure is located can be scanned to generate scan data 224 for region 226 of physical object 204 in reference model 236 of physical object 204.

As another example, enhanced model 232 of images 222 and scan data 224 can be used to create reference model 236. This type of process can be useful when reference model 236 did not previously exist.

In another illustrative example, the type of physical object is known but more detailed identification of the reference model to be used may not be known. For example, with an aircraft, several reference models may be present for a particular type of aircraft but the particular model of the aircraft or identifier number of the aircraft may not be known. Enhanced model 232 can be used to identify a particular reference model for use. In some cases, a degree of confidence in identifying the physical object can be less than 100 percent. In this case, a subset of reference models can be identified for use.

Figure 5:
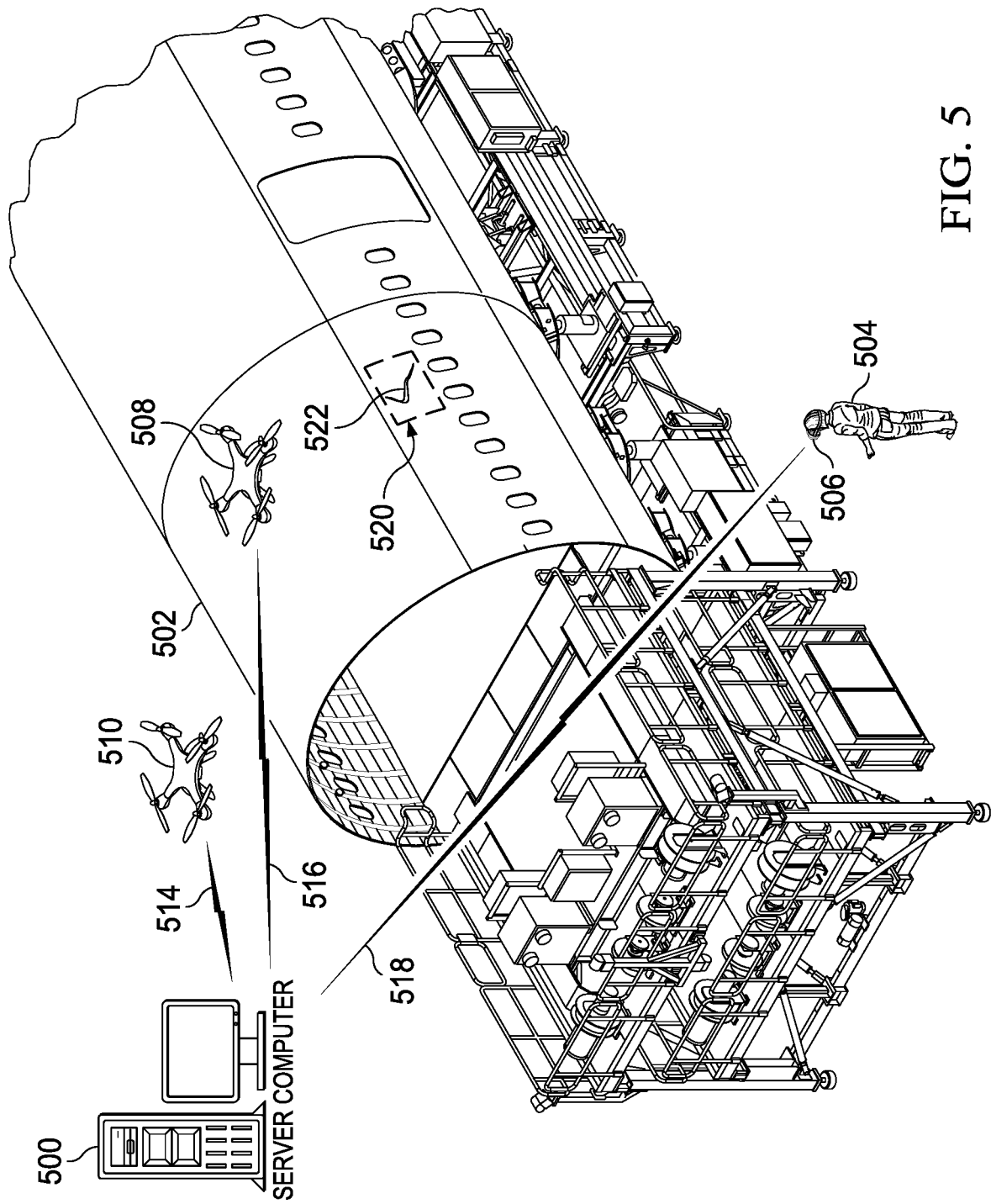
FIG. 5 is a pictorial illustration of a visualization environment in accordance with an illustrative embodiment.

Turning next to FIG. 5, a pictorial illustration of a visualization environment is depicted in accordance with an illustrative embodiment. In this illustrative example, visualization environment 500 is an example of an implementation of visualization environment 200 in FIG. 2.

In this illustrative example, visualization environment 500 includes fuselage section 502. As depicted, human operator 504 performs an inspection of fuselage section 502 in a current phase of manufacture. As depicted, human operator 504 wears smart glasses 506, which is a type of portable computing device. Additionally, unmanned aerial vehicle 508 and unmanned aerial vehicle 510, which are quadcopters in this depicted example.

As depicted, unmanned aerial vehicle 508 and aerial vehicle 510 generate images of fuselage section 502. Additionally, unmanned aerial vehicle 508 and unmanned aerial vehicle 510 can also scan one or more regions of fuselage section 502 scan data. For example, unmanned aerial vehicle 508 can scan region 520 encompassing a nonconformance 512 in the form of a crack in fuselage section 502.

The images and scan data generated by unmanned aerial vehicle 508 and unmanned aerial vehicle 510 are sent to server computer 512 over wireless communications link 514 and wireless communications link 516.

As depicted, server computer 512 generates an enhanced model using the images and scan data received from unmanned aerial vehicle 508 and unmanned aerial vehicle 510. As depicted, the scan data for region 520 provides a higher resolution of visualization of region 520 including nonconformance 512.

At least a portion of the enhanced model is sent to smart glasses 506 over wireless communications link 518. The portion of the enhanced model sent to smart glasses 506 is information that can be rendered and displayed by smart glasses 506 to augment the live view of the region 520 for human operator 504.

Figure 6:
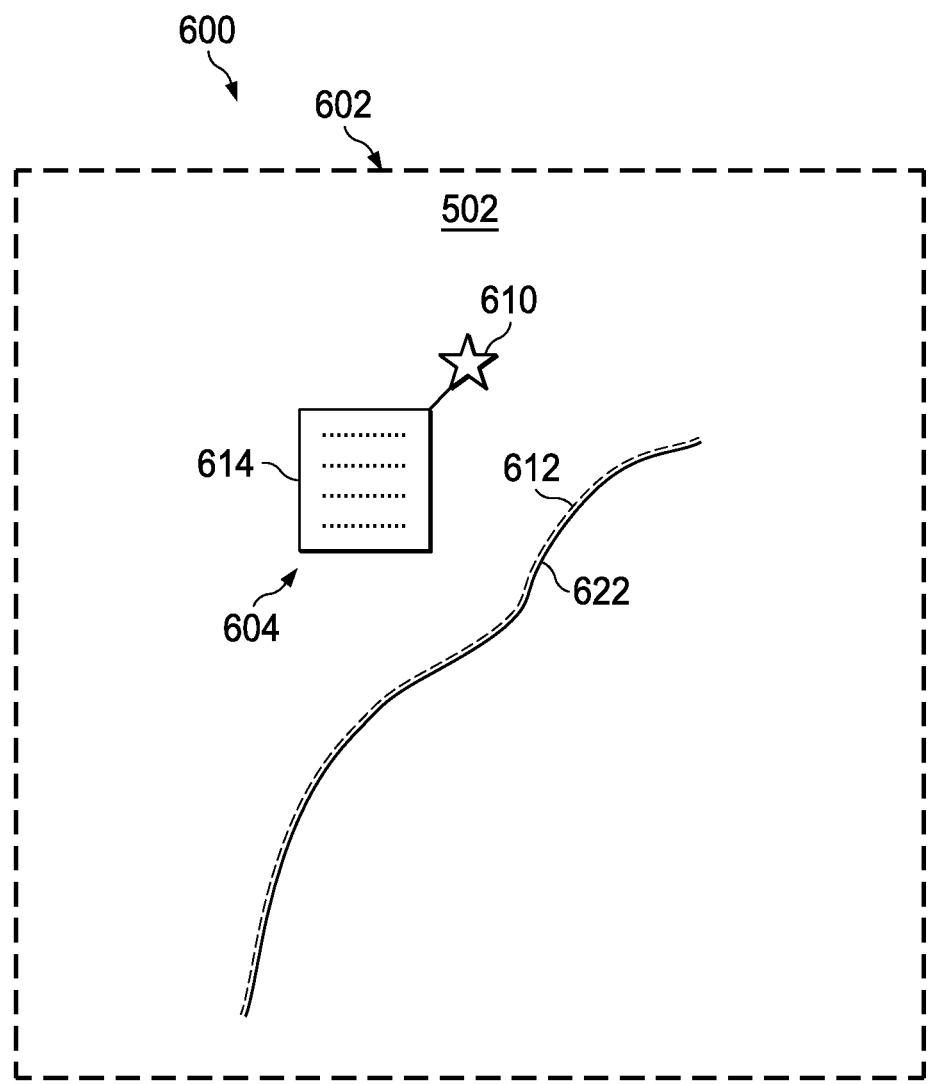
FIG. 6 is a pictorial illustration of a graphical user interface in accordance with an illustrative embodiment.

With reference to FIG. 6, a pictorial illustration of a graphical user interface is depicted in accordance with an illustrative embodiment. In this illustrative example, graphical user interface 600 is displayed on smart glasses 506 on human operator 504 in FIG. 5.

In this illustrative example, graphical user interface 600 comprises live view 602 of fuselage section 502 with information 604 from an enhanced model augmenting live view 602. Information 604 can also be referred to as augmented reality information. In this illustrative example, information 604 includes graphical indicator 610 that identifies nonconformance 512 in live view 602 of fuselage section 502. Graphical indicator 610 may draw the attention of human operator 504 to this nonconformance in live view 602 of fuselage section 502. Further, graphical indicator 612 highlights nonconformance 512. Graphical indicator 612 is more accurately displayed on live view 602 of nonconformance 512 using the scan data in addition to images. Further, information 604 also includes work order 614 displayed on live view 602 that identifies operations to be performed with respect to nonconformance 522.

Figure 7:
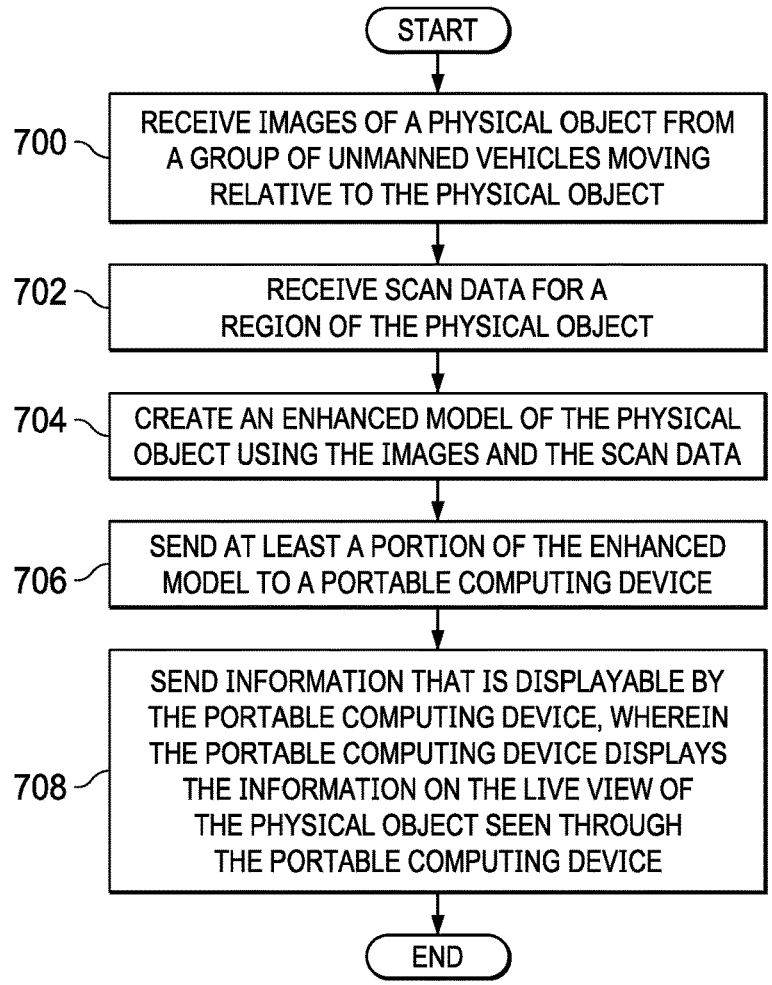
FIG. 7 is an illustration of a flowchart of a process for visualizing information on a live view of a physical object in accordance with an illustrative embodiment.

Turning next to FIG. 7, an illustration of a flowchart of a process for visualizing information on a live view of a physical object is depicted in accordance with an illustrative embodiment. The process in FIG. 7 can be implemented in hardware, software, or both. When implemented in software, the process can take the form of program code that is run by one or more processor units located in one or more hardware devices in one or more computer systems. For example, the process can be implemented in visualizer 230 in computer system 218 in FIG. 2.

The process begins by receiving images of a physical object from a group of unmanned vehicles moving relative to the physical object (operation 700). In operation 700, the images are received over communications links with the unmanned vehicles.

The process receives scan data for a region of the physical object (operation 702). The scan data is received from a number of the unmanned vehicles in the group of unmanned vehicles over a number of communications links.

The process creates an enhanced model of the physical object using the images and the scan data (operation 704). The region in the enhanced model has greater detail than the other regions of the physical object in the enhanced model. The greater detail can be increased resolution which can aid in greater accuracy in placing information on a live view of the region of the physical object.

The process sends at least a portion of the enhanced model to a portable computing device (operation 706). The portable computing device localizes to the physical object using at least the portion of the enhanced model.

The process sends information that is displayable by the portable computing device, wherein the portable computing device displays the information on the live view of the physical object seen through the portable computing device (operation 708). The process terminates thereafter.

In operation 708, the information is identified using the enhanced model of the physical object. For example, from identifying a location on the physical object seen in the live view of the physical object, that location can be identified in enhanced model, which can be used to identify a corresponding location in a reference model of the physical object which contains the information. For example, feature extraction and semantic scene segmentation can be performed on electro-optic (EO) images or infrared (IR) images. Using image classification and object recognition, the acquired images may align the scanned information to the reference model.

In some circumstances, other location features or signatures are present that can define hard (immobile) or soft (predominately fixed) waypoints. These location signatures can be such things as physical position as determined by a global positioning system and acquisition orientation. Alternatively, auto identification can be performed using at least one of two-dimensional barcodes or three-dimensional barcodes. Auto identification can also be performed using radio frequency identifiers, known logos, or known identifier plates onboard an aircraft with a predefined configuration. The information for a desired corresponding location in the reference model can be obtained from the reference model.

Figure 8:
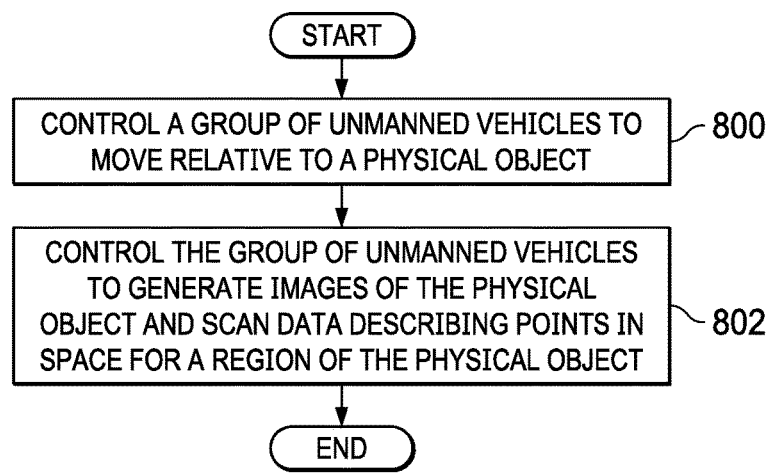
FIG. 8 is an illustration of a flowchart of a process for controlling unmanned vehicles to generate information for creating an enhanced model in accordance with an illustrative embodiment.

With reference to FIG. 8, an illustration of a flowchart of a process for controlling unmanned vehicles to generate information for creating an enhanced model is depicted in accordance with an illustrative embodiment. The process in FIG. 8 can be implemented in hardware, software, or both. When implemented in software, the process can take the form of program code that is run by one or more processor units located in one or more hardware devices in one or more computer systems. For example, the process can be implemented in visualizer 230 in computer system 218 in FIG. 2.

The information includes at least one of images or scan data. The images can be used to create a model of the physical object. The scan data can be used to enhance the model in one or more regions to have greater detail to form the enhanced model.

The process begins by controlling a group of unmanned vehicles to move relative to a physical object (operation 800). The process controls the group of unmanned vehicles to generate images of the physical object and scan data describing points in space for a region of the physical object (operation 802). The generation of the images can occur while the unmanned vehicles move relative to the physical object. Further, the generation of the images can occur with one or more of the unmanned vehicles in fixed positions relative to the object. In other words, the images can be generated while the unmanned vehicles move, while the unmanned vehicles are a particular fixed position, or some combination thereof. The process terminates thereafter.

Figure 9:
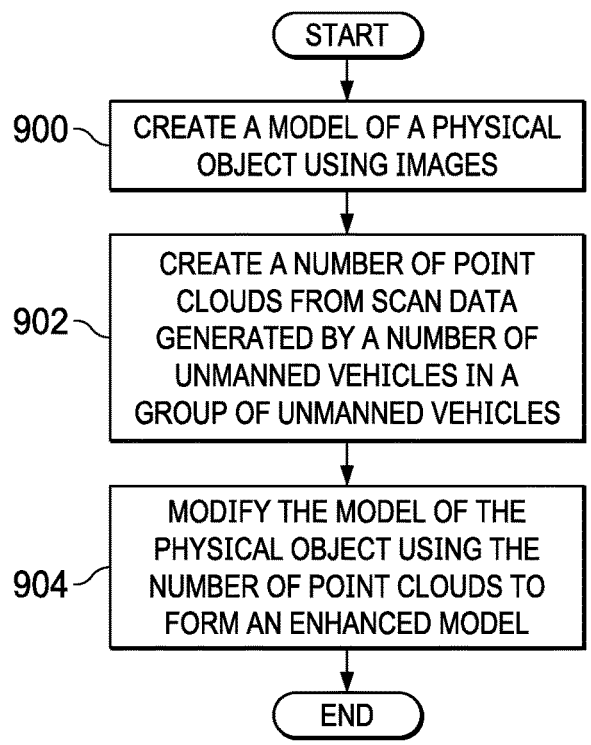
FIG. 9 is an illustration of a flowchart of a process for creating an enhanced model of a physical object in accordance with an illustrative embodiment.

With reference to FIG. 9, an illustration of a flowchart of a process for creating an enhanced model of a physical object is depicted in accordance with an illustrative embodiment. The process in FIG. 9 is an example of one implementation of operation 704 in FIG. 7.

The process begins by creating a model of a physical object using images (operation 900). The process creates a number of point clouds from scan data generated by a number of unmanned vehicles in a group of unmanned vehicles (operation 902).

The process modifies the model of the physical object using the number of point clouds to form an enhanced model (operation 904). The process terminates thereafter. In operation 904, the process can replace the portion of the model for the region with the model of the region generated using the number of point clouds.

Figure 10:
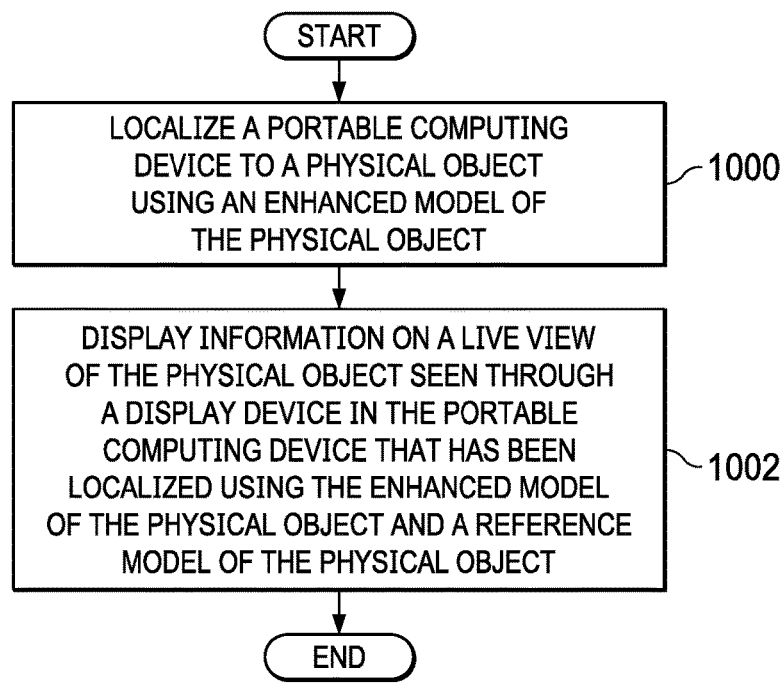
FIG. 10 is an illustration of a flowchart of a process for visualizing information on a live view of a physical object in accordance with an illustrative embodiment.

Turning to FIG. 10, an illustration of a flowchart of a process for visualizing information on a live view of a physical object is depicted in accordance with an illustrative embodiment. The process in FIG. 10 can be implemented in hardware, software, or both. When implemented in software, the process can take the form of program code that is run by one or more processor units located in one or more hardware devices in one or more computer systems. For example, the process can be implemented in portable computing device 208 in augmented reality system 216 in FIG. 2.

The process begins by localizing a portable computing device to a physical object using an enhanced model of the physical object (operation 1000). The localization in operation 1000 can be performed using simultaneous location and mapping (SLAM) processes running on the portable computing device.

The process displays information on a live view of the physical object seen through a display device in the portable computing device that has been localized using the enhanced model of the physical object and a reference model of the physical object (operation 1002). In operation 1002, a location on the live view of the physical object can be correlated to the corresponding location on the enhanced model. In turn, the location in the enhanced model can be correlated to the reference model of the physical object. The information can be identified based on the location in the reference model. This information can be displayed on the live view of the physical object. These correlations can be performed using currently available image registration processes.

Operation 1002 can be implemented using currently available augmented reality applications, such as Vuforia™ augmented reality software developed by Vuforia and PTC Incorporated. The process terminates thereafter.

The flowcharts and block diagrams in the different depicted embodiments illustrate the architecture, functionality, and operation of some possible implementations of apparatuses and methods in an illustrative embodiment. In this regard, each block in the flowcharts or block diagrams can represent at least one of a module, a segment, a function, or a portion of an operation or step. For example, one or more of the blocks can be implemented as program code, hardware, or a combination of the program code and hardware. When implemented in hardware, the hardware can, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams can be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

Further, the examples are described with respect to operations being performed by visualizer 230 in FIG. 2 as an example. In other illustrative examples, these processes can be performed by other components including at least one of artificial intelligence system 404 in FIG. 4 or visualizer 128 in FIG. 1.

Figure 11:
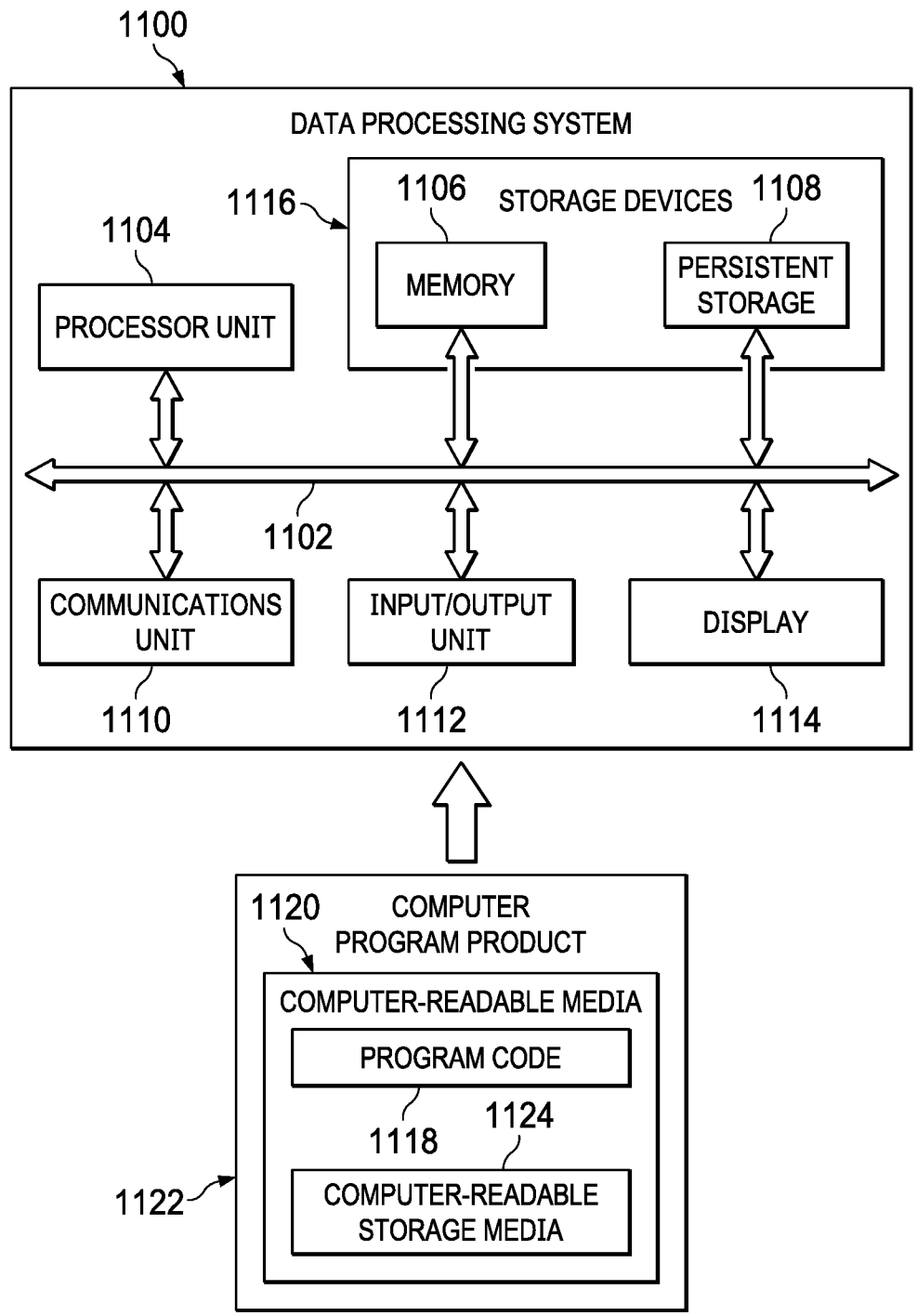
FIG. 11 is an illustration of a block diagram of a data processing system in accordance with an illustrative embodiment.

Turning now to FIG. 11, an illustration of a block diagram of a data processing system is depicted in accordance with an illustrative embodiment. Data processing system 1100 can be used to implement server computer 104, server computer 106, and client devices 110 in FIG. 1. Data processing system 1100 can also be used to implement computer system 218 and portable computing device 208 in FIG. 2. In this illustrative example, data processing system 1100 includes communications framework 1102, which provides communications between processor unit 1104, memory 1106, persistent storage 1108, communications unit 1110, input/output (I/O) unit 1112, and display 1114. In this example, communications framework 1102 takes the form of a bus system.

Processor unit 1104 serves to execute instructions for software that can be loaded into memory 1106. Processor unit 1104 includes one or more processors. For example, processor unit 1104 can be selected from at least one of a multicore processor, a central processing unit (CPU), a graphics processing unit (GPU), a physics processing unit (PPU), a digital signal processor (DSP), a network processor, or some other suitable type of processor.

Memory 1106 and persistent storage 1108 are examples of storage devices 1116. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 1116 may also be referred to as computer-readable storage devices in these illustrative examples. Memory 1106, in these examples, can be, for example, a random-access memory or any other suitable volatile or non-volatile storage device. Persistent storage 1108 can take various forms, depending on the particular implementation.

For example, persistent storage 1108 may contain one or more components or devices. For example, persistent storage 1108 can be a hard drive, a solid-state drive (SSD), a flash memory, a rewritable optical disk, a rewritable magnetic tape, or some combination of the above. The media used by persistent storage 1108 also can be removable. For example, a removable hard drive can be used for persistent storage 1108.

Communications unit 1110, in these illustrative examples, provides for communications with other data processing systems or devices. In these illustrative examples, communications unit 1110 is a network interface card.

Input/output unit 1112 allows for input and output of data with other devices that can be connected to data processing system 1100. For example, input/output unit 1112 can provide a connection for user input through at least one of a keyboard, a mouse, or some other suitable input device. Further, input/output unit 1112 can send output to a printer. Display 1114 provides a mechanism to display information to a user.

Instructions for at least one of the operating system, applications, or programs can be located in storage devices 1116, which are in communication with processor unit 1104 through communications framework 1102. The processes of the different embodiments can be performed by processor unit 1104 using computer-implemented instructions, which can be located in a memory, such as memory 1106.

These instructions are referred to as program code, computer usable program code, or computer-readable program code that can be read and executed by a processor in processor unit 1104. The program code in the different embodiments can be embodied on different physical or computer-readable storage media, such as memory 1106 or persistent storage 1108.

Program code 1118 is located in a functional form on computer-readable media 1120 that is selectively removable and can be loaded onto or transferred to data processing system 1100 for execution by processor unit 1104. Program code 1118 and computer-readable media 1120 form computer program product 1122 in these illustrative examples. In the illustrative example, computer-readable media 1120 is computer-readable storage media 1124.

In these illustrative examples, computer-readable storage media 1124 is a physical or tangible storage device used to store program code 1118 rather than a medium that propagates or transmits program code 1118.

Alternatively, program code 1118 can be transferred to data processing system 1100 using a computer-readable signal media. The computer-readable signal media can be, for example, a propagated data signal containing program code 1118. For example, the computer-readable signal media can be at least one of an electromagnetic signal, an optical signal, or any other suitable type of signal. These signals can be transmitted over connections, such as tethered communications links or wireless communications links. Tethered communications links can include connections made using optical fiber cable, coaxial cable, a wire, or any other suitable type of connection.

The different components illustrated for data processing system 1100 are not meant to provide architectural limitations to the manner in which different embodiments can be implemented. In some illustrative examples, one or more of the components may be incorporated in, or otherwise form, a portion of another component. For example, memory 1106, or portions thereof, can be incorporated in processor unit 1104 in some illustrative examples. The different illustrative embodiments can be implemented in a data processing system including components in addition to or in place of those illustrated for data processing system 1100. Other components shown in FIG. 11 can be varied from the illustrative examples shown. The different embodiments can be implemented using any hardware device or system capable of running program code 1118.

Figure 12:
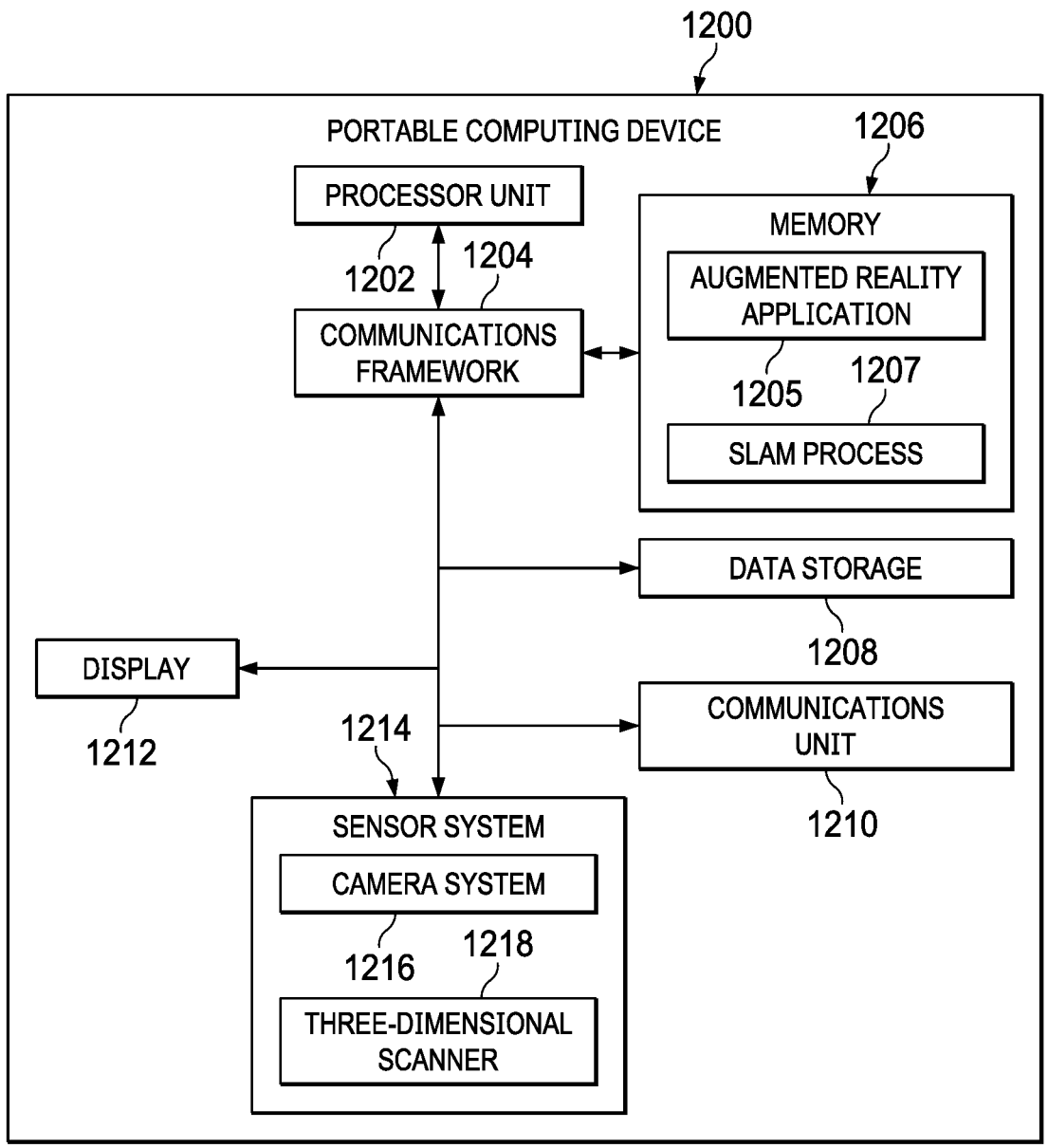
FIG. 12 is an illustration of a block diagram of a portable computing device in accordance with an illustrative embodiment.

With reference to FIG. 12, an illustration of a block diagram of a portable computing device is depicted in accordance with an illustrative embodiment. Portable computing device 1200 is an example of one manner in which portable computing device 208 in FIG. 2 can be implemented. In this illustrative example, portable computing device 1200 includes physical hardware components such as processor unit 1202, communications framework 1204, memory 1206, data storage 1208, communications unit 1210, display 1212, and sensor system 1214.

Communications framework 1204 allows different components in portable computing device 1200 to communicate with each other when connected to communications framework 1204. Communications framework 1204 is a bus system in this illustrative example.

Processor unit 1202 processes program code for software loaded into memory 1206. In this illustrative example, program code may include applications such as augmented reality application 1205 and simultaneous localization and mapping (SLAM) process 1207. Augmented reality application 1205 can operate to display information on a live view of the physical object seen through displaying 1212 in portable computing device 1200 to provide an augmented reality view.

Simultaneous localization and mapping process 1207 can operate to create a map or model of the physical object. Additionally, this process can also operate to localize or identify the position of portable computing device 1200 relative to the physical object. This process can be used to determine where to display information with respect to a live view of the physical object.

Processor unit 1202 include one or more processors. For example, processor unit 1202 can be selected from at least one of a multicore processor, a central processing unit (CPU), a graphics processing unit (GPU), a physics processing unit (PPU), a digital signal processor (DSP), a network processor, or some other suitable type of processor.

Memory 1206 is connected to processor unit 1202 through communications framework 1204. As depicted, memory 1206 can include at least one of a random-access memory (RAM), a read-only memory (ROM), a static random-access memory (SRAM), a dynamic random-access memory (DRAM), or other suitable types of memory devices or circuits.

As depicted, data storage 1208 is connected to communications framework 1204 and can store data, program code, or other information. Instructions in program code can be loaded from data storage 1208 into memory 1206 for processing by processor unit 1202. Data storage 1208 can comprise at least one of a hard disk drive, a flash drive, a solid-state disk drive, an optical drive, or some other suitable type of data storage device or system.

In this illustrative example, communications unit 1210 provides for communications with other data processing systems or devices. In these illustrative examples, communications unit 1210 includes at least one of a network interface card, a wireless communications device, a universal serial bus port, or other suitable device.

Display 1212 is connected to communications framework 1204 and provides a mechanism to display information to a user. In this example, display 1212 can be a touch screen display, which enables receiving user input through this display.

In this illustrative example, sensor system 1214 is connected to communications framework 1204. As depicted, sensor system 1214 can include hardware, software, or both that control the operation of camera system 1216 and three-dimensional scanner 1218 in sensor system 1214. Camera system 1216 is physical hardware that comprises one or more cameras that is capable of recording or capturing images. Camera system 1216 is one or more digital cameras and can include at least one of a stereo camera, a mirrorless camera, or some other type of imaging device. The cameras can also be, for example, at least one of electro-optical or infrared cameras. The images may be individual images for images for a video.

Three-dimensional scanner 1218 is hardware that is capable of scanning a physical object to generate scan data. The scan data describes points on the physical object. The scan data can be used to generate a model of a region of the object that is more detailed than other regions of the object created using images. This data can be used in conjunction with simultaneous location and mapping process 1207 to map the object as well as localize portable computing device 1200 to the physical object. Three-dimensional scanner 1218 can take a number of different forms. For example, three-dimensional scanner 1218 can be selected from at least one of a laser scanner, a lidar system, an infrared scanner, or some other type of scanning system.

The illustration of portable computing device 1200 is an example of one manner in which portable computing device 1200 can be implemented. This illustration is not meant to limit the manner in which portable computing device 1200 can be embodied in other illustrative examples.

Figure 13:
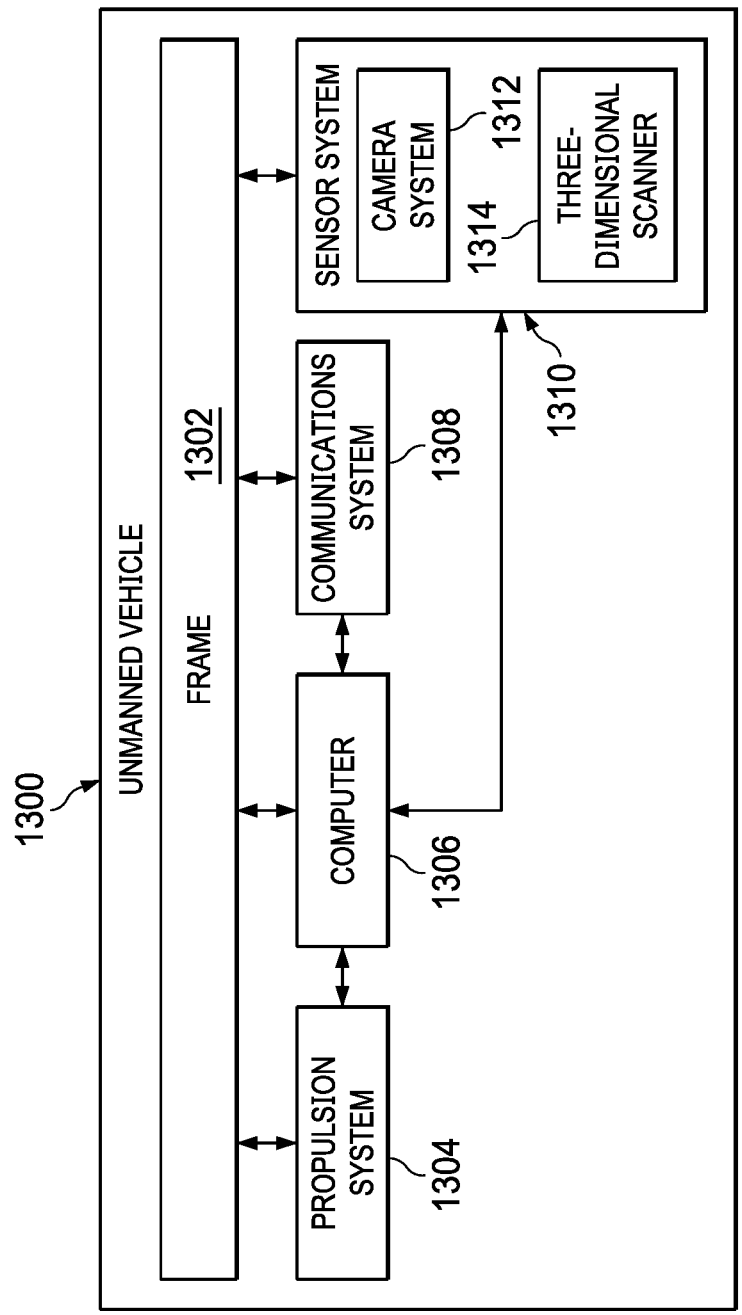
FIG. 13 is an illustration of a block diagram of an unmanned vehicle device in accordance with an illustrative embodiment.

With reference to FIG. 13, an illustration of a block diagram of an unmanned vehicle device is depicted in accordance with an illustrative embodiment. Unmanned vehicle 1300 is an example of one manner in which unmanned aerial vehicle 112 in FIG. 1, unmanned aerial vehicle 114 in FIG. 1, unmanned aerial vehicle 116 in FIG. 1, and unmanned vehicles 220 in FIG. 2 can be implemented.

In this illustrative example, unmanned vehicle 1300 is comprised of a number of components. As depicted, unmanned vehicle 1300 includes frame 1302, propulsion system 1304, computer 1306, communications system 1308, and sensor system 1310.

Frame 1302 is a physical structure that is designed based on a type of locomotion used by unmanned vehicle 1300. For example, if unmanned vehicle 1300 is an unmanned aerial vehicle, unmanned vehicle 1300 can have aerodynamic surfaces. If unmanned vehicle 1300 is an unmanned water vehicle, unmanned vehicle 1300 can be a hull for use in water. In this illustrative example, propulsion system 1304, computer 1306, communications system 1308, and sensor system 1310 are connected to frame 1302.

Propulsion system 1304 is a hardware system that causes unmanned vehicle 1300 to move. For example, propulsion system 1304 can include a jet engine, rotors, or other propulsion components when unmanned vehicle 1300 is an unmanned aerial vehicle.

Computer 1306 is hardware that controls the operation of components in unmanned vehicle 1300. For example, computer 1306 can control the operations of propulsion system 1304, communications system 1308, and sensor system 1310.

Communications system 1308 is hardware that provides communications using a tethered communications link or a wireless communications link. This communications link can be established with remote computers on the ground or in other unmanned vehicles. A wireless communications link can use radio frequencies signals or optical signals.

Sensor system 1310 includes hardware, software, or both. As depicted, sensor system 1310 comprises camera system 1312 and three-dimensional scanner 1314.

Figure 14:
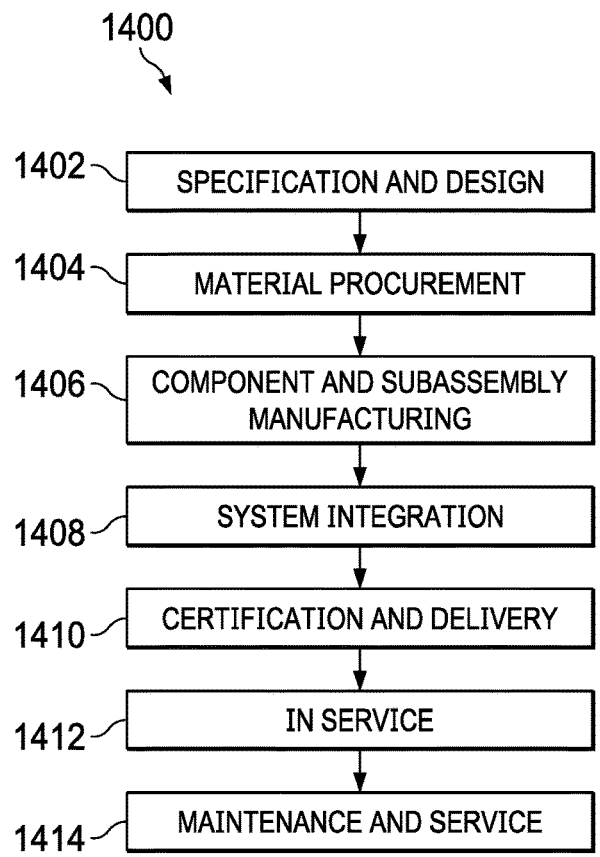
FIG. 14 is an illustration of a block diagram of an aircraft manufacturing and service method in accordance with an illustrative embodiment.
Figure 15:
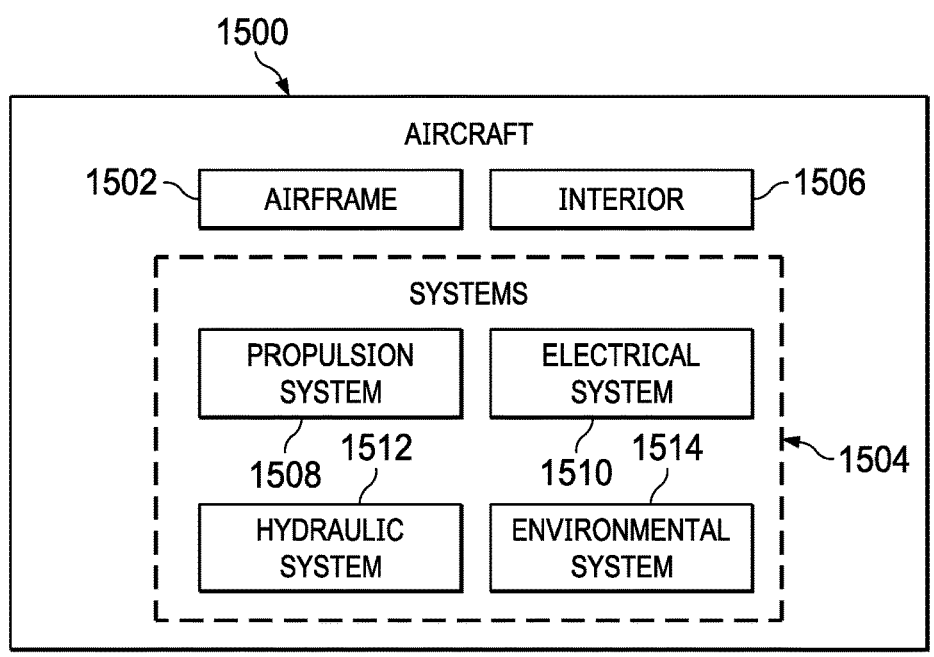
FIG. 15 is an illustration of a block diagram of an aircraft in which an illustrative embodiment may be implemented.

Illustrative embodiments of the disclosure may be described in the context of aircraft manufacturing and service method 1400 as shown in FIG. 14 and aircraft 1500 as shown in FIG. 15. Turning first to FIG. 14, an illustration of a block diagram of an aircraft manufacturing and service method is depicted in accordance with an illustrative embodiment. During pre-production, aircraft manufacturing and service method 1400 may include specification and design 1402 of aircraft 1500 in FIG. 15 and material procurement 1404.

During production, component and subassembly manufacturing 1406 and system integration 1408 of aircraft 1500 in FIG. 15 takes place. Thereafter, aircraft 1500 in FIG. 15 can go through certification and delivery 1410 in order to be placed in service 1412. While in service 1412 by a customer, aircraft 1500 in FIG. 15 is scheduled for routine maintenance and service 1414, which may include modification, reconfiguration, refurbishment, and other maintenance or service.

Each of the processes of aircraft manufacturing and service method 1400 may be performed or carried out by a system integrator, a third party, an operator, or some combination thereof. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 15, an illustration of a block diagram of an aircraft is depicted in which an illustrative embodiment may be implemented. In this example, aircraft 1500 is produced by aircraft manufacturing and service method 1400 in FIG. 14 and may include airframe 1502 with plurality of systems 1504 and interior 1506. Examples of systems 1504 include one or more of propulsion system 1508, electrical system 1510, hydraulic system 1512, and environmental system 1514. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 1400 in FIG. 14.

In one illustrative example, components or subassemblies produced in component and subassembly manufacturing 1406 in FIG. 14 can be fabricated or manufactured in a manner similar to components or subassemblies produced while aircraft 1500 is in service 1412 in FIG. 14. As yet another example, one or more apparatus embodiments, method embodiments, or a combination thereof can be utilized during production stages, such as component and subassembly manufacturing 1406 and system integration 1408 in FIG. 14. One or more apparatus embodiments, method embodiments, or a combination thereof may be utilized while aircraft 1500 is in service 1412, during maintenance and service 1414 in FIG. 14, or both.

For example, augmented reality system 216 in FIG. 2 can be used to provide visualizations of task locations. These visualizations can include displaying task information to be performed at the task locations. Augmented reality system 216 can be utilized by human operators during at least one of component and subassembly manufacturing 1406, system integration 1408, certification and delivery 1410, or maintenance and service 1414. Augmented reality system 216 can be useful in viewing larger objects such as the partially assembled aircraft as compared to using current techniques for augmenting the live view of objects.

The use of a number of the different illustrative embodiments may substantially expedite the assembly of aircraft 1500, reduce the cost of aircraft 1500, or both expedite the assembly of aircraft 1500 and reduce the cost of aircraft 1500. For example, the amount of processor resources needed to inform operations can be reduced as well as reducing the amount of time needed to generate models for use in performing operations on objects such as aircraft 1500 or a portion thereof.

Figure 16:
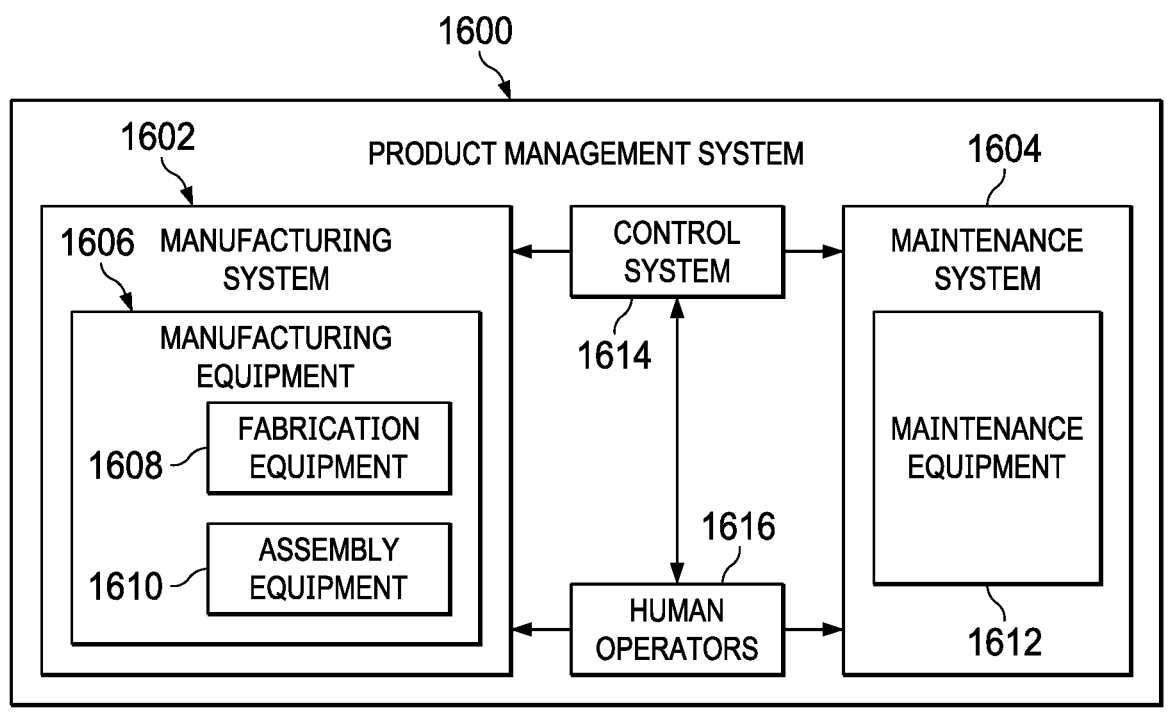
FIG. 16 is an illustration of a block diagram of a product management system in accordance with an illustrative embodiment.

Turning now to FIG. 16, an illustration of a block diagram of a product management system is depicted in accordance with an illustrative embodiment. Product management system 1600 is a physical hardware system. In this illustrative example, product management system 1600 includes at least one of manufacturing system 1602 or maintenance system 1604.

Manufacturing system 1602 is configured to manufacture products, such as aircraft 1500 in FIG. 15. As depicted, manufacturing system 1602 includes manufacturing equipment 1606. Manufacturing equipment 1606 includes at least one of fabrication equipment 1608 or assembly equipment 1610.

Fabrication equipment 1608 is equipment that used to fabricate components for parts used to form aircraft 1500 in FIG. 15. For example, fabrication equipment 1608 can include machines and tools. These machines and tools can be at least one of a drill, a hydraulic press, a furnace, a mold, a composite tape laying machine, a vacuum system, a lathe, augmented reality system 216 in FIG. 2, or other suitable types of equipment. Fabrication equipment 1608 can be used to fabricate at least one of metal parts, composite parts, semiconductors, circuits, fasteners, ribs, skin panels, spars, antennas, or other suitable types of parts.

Assembly equipment 1610 is equipment used to assemble parts to form aircraft 1500 in FIG. 15. In particular, assembly equipment 1610 is used to assemble components and parts to form aircraft 1500. Assembly equipment 1610 also can include machines and tools. These machines and tools may be at least one of a robotic arm, a crawler, a faster installation system, a rail-based drilling system, augmented reality system 216 in FIG. 2, or a robot. Assembly equipment 1610 can be used to assemble parts such as seats, horizontal stabilizers, wings, engines, engine housings, landing gear systems, and other parts for aircraft 1500 in FIG. 15.

In this illustrative example, maintenance system 1604 includes maintenance equipment 1612. Maintenance equipment 1612 can include any equipment needed to perform maintenance on aircraft 1500. Maintenance equipment 1612 may include tools for performing different operations on parts on aircraft 1500. These operations can include at least one of disassembling parts, refurbishing parts, inspecting parts, reworking parts, manufacturing replacement parts, or other operations for performing maintenance on aircraft 1500 in FIG. 15. These operations can be for routine maintenance, inspections, upgrades, refurbishment, or other types of maintenance operations.

In the illustrative example, maintenance equipment 1612 may include ultrasonic inspection devices, x-ray imaging systems, vision systems, drills, crawlers, and other suitable devices. In some cases, maintenance equipment 1612 can include fabrication equipment 1608, assembly equipment 1610, or both to produce and assemble parts that needed for maintenance.

Product management system 1600 also includes control system 1614. Control system 1614 is a hardware system and may also include software or other types of components. Control system 1614 is configured to control the operation of at least one of manufacturing system 1602 or maintenance system 1604. In particular, control system 1614 can control the operation of at least one of fabrication equipment 1608, assembly equipment 1610, or maintenance equipment 1612.

The hardware in control system 1614 can be implemented using hardware that may include computers, circuits, networks, and other types of equipment. The control may take the form of direct control of manufacturing equipment 1606. For example, robots, computer-controlled machines, and other equipment can be controlled by control system 1614. In other illustrative examples, control system 1614 can manage operations performed by human operators 1616 in manufacturing or performing maintenance on aircraft 1500. For example, control system 1614 can assign tasks, provide instructions, display models, or perform other operations to manage operations performed by human operators 1616. In these illustrative examples, augmented reality system 216 in FIG. 2 can be implemented in or for with control system 1614 to manage at least one of the manufacturing or maintenance of aircraft 1500 in FIG. 15.

For example, control system 1614 can assign tasks such as assemble or perform maintenance on an object such as an aircraft, a building, a dam, or some other suitable object to one or more of human operators 1616. Control system 1614 can send task information to augment live views to portable computing devices in augmented reality system 216 in FIG. 2 worn or carried by human operators 1616.

In the different illustrative examples, human operators 1616 can operate or interact with at least one of manufacturing equipment 1606, maintenance equipment 1612, or control system 1614. This interaction can occur to manufacture aircraft 1500 in FIG. 15.

Of course, product management system 1600 may be configured to manage other products other than aircraft 1500 in FIG. 15. Although product management system 1600 has been described with respect to manufacturing in the aerospace industry, product management system 1600 can be configured to manage products for other industries. For example, product management system 1600 can be configured to manufacture products for the automotive industry as well as any other suitable industries.

Thus, one or more illustrative examples overcome a technical problem with displaying information to augment a live view of the physical object in a manner the reduces the amount of processing resources as compared to currently used techniques that generate point clouds of the physical object. As a result, one or more illustrative examples can provide a technical effect of reducing the amount of computing resources used to create a model of a physical object using two types of data. In the illustrative example, images and scan data are used to reduce the amount of computing resources used as compared to current techniques that only use point clouds.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component can be configured to perform the action or operation described. For example, the component can have a configuration or design for a structure that provides the component an ability to perform the action or operation that is described in the illustrative examples as being performed by the component.

Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An augmented reality system that comprises:
    a group of unmanned vehicles configured to: move relative to a physical object, generate images of the physical object, generate scan data descriptive of points in space for a region of the physical object, and communicate with a computer system configured to simultaneously:
        receive the images of the physical object from the group of unmanned vehicles moving relative to the physical object;
        receive the scan data descriptive of points in space for the region of the physical object from a number of unmanned vehicles in the group of unmanned vehicles moving relative to the physical object;
        create, based upon the images and the scan data descriptive of points in space for the region, an enhanced model of the physical object that comprises a greater level of detail and granularity of data about the region than a level of detail and granularity of the region in a model of the physical object generated prior to the enhanced model, such that the region of the physical object in the enhanced model comprises a greater amount of detail than other regions of the physical object in the enhanced model; and
        identify nonconformances in the region and update, based upon a scan of a changed structure on the physical object, the model of the physical object generated prior to the enhanced model;
        classify the nonconformances of the changed structure; and
    a portable computing device configured to:
        localize, based upon the enhanced model, to the physical object; and
        display information, identified based upon the enhanced model and a correlated location on the model of the physical object generated prior to the enhanced model, on a live view of the physical object seen through the portable computing device that identifies an operation to be performed on a nonconformance in the nonconformances.

2. The augmented reality system of claim 1, further comprising the computer system configured to:
    control the group of unmanned vehicles to move relative to the physical object and conduct electromagnetic, acoustic, or pressure scans, and generate the images of the physical object and scan data that describe points in space for the region of the physical object.

3. The augmented reality system of claim 1, further comprising the computer system configured to:
    create, based upon the images, the model of the physical object generated prior to the enhanced model;
    create a number of point clouds from scan data generated by the number of unmanned vehicles in the group of unmanned vehicles;
    assess a health, remaining life, or suitability for use, of the physical object; and
    modify the model of the physical object using the number of point clouds to form the enhanced model.

4. The augmented reality system of claim 1, further comprising the group of unmanned vehicles configured to generate the images and the scan data descriptive of points in space for the region while the portable computing device presents the live view of the physical object.

5. The augmented reality system of claim 1, further comprising the computer system configured to select the region of the physical object and control the number of unmanned vehicles in the group of unmanned vehicles to generate scan data of the region of the physical object.

6. The augmented reality system of claim 1, further comprising the computer system configured to select the region of the physical object based on an artificial intelligence.

7. The augmented reality system of claim 1, further comprising the computer system configured to select the region of the physical object based on a location for a task performed by a human operator using the portable computing device, wherein the location is encompassed by the region.

8. The augmented reality system of claim 1, further comprising the computer system configured to:
receive at least one of additional images of the physical object or additional scan data of the physical object from the portable computing device; and
create, based upon the images, the additional images, the scan data, and the additional scan data, the enhanced model of the physical object.

9. The augmented reality system of claim 1, wherein the information is selected from at least one of: task information, an assembly, a video, an indication of a non-conformance, a work order, an exploded view of the assembly, or a schematic diagram.

10. The augmented reality system of claim 1, wherein the physical object is selected from one of: an airplane, a building, a bridge, a dam, a vehicle, a field, a lake, a mountain, an engine, a fuselage section, and a runway.

11. The augmented reality system of claim 1, wherein the portable computing device is selected from one of: smart glasses, a mobile phone, a tablet computer, and a head-mounted display.

12. The augmented reality system of claim 1, wherein the group of unmanned vehicles is selected from at least one of an unmanned aerial vehicle, a drone, an unmanned ground vehicle, or an unmanned water vehicle.

13. An augmented reality system that comprises:
a computer system that comprises:
communications links with a group of unmanned vehicles;
a visualizer configured to simultaneously:
receive images of a physical object from the group of unmanned vehicles moving relative to the physical object;
receive scan data for a region of the physical object from a number of unmanned vehicles in the group of unmanned vehicles moving relative to the physical object;
create, based on the images and the scan data, an enhanced model of the physical object that comprises a greater level of detail and granularity of data about the region than a level of detail and granularity of the region in a model of the physical object generated prior to the enhanced model, such that the region of the physical object in the enhanced model comprises a greater amount of detail than other regions of the physical object in the enhanced model;
identify nonconformances in the region and update, based upon a scan of a changed structure on the physical object, the model of the physical object generated prior to the enhanced model;
classify the nonconformances of the changed structure; and
send information, based upon the enhanced model updated for the changed structure, to a portable computing device configured to display the information on a live view of the physical object seen through the portable computing device that identifies an operation to be performed on a nonconformance in the nonconformances.

14. The augmented reality system of claim 13, further comprising the visualizer configured to:
control the group of unmanned vehicles to:
move relative to the physical object; and
generate the images of the physical object and scan data that describe points in space for the region of the physical object.

15. The augmented reality system of claim 13, further comprising the visualizer configured to:
select the region of the physical object and control the number of unmanned vehicles in the group of unmanned vehicles to generate the scan data of the region of the physical object; and
assess a health, remaining life, or suitability for use, of the physical object.

16. The augmented reality system of claim 15, further comprising the visualizer configured to select the region of the physical object based on an artificial intelligence.

17. The augmented reality system of claim 15, further comprising the visualizer configured to: select the region of the physical object based a location for a task that utilizes the portable computing device, wherein the location is encompassed by the region.

18. The augmented reality system of claim 15, wherein the group of unmanned vehicles is selected from at least one of an unmanned aerial vehicle, a drone, an unmanned ground vehicle, or an unmanned water vehicle.

19. A method for visualizing information of a physical object on a live view of the physical object, the method comprising, simultaneously:
receiving, by a computer system, images of the physical object from group of unmanned vehicles moving relative to the physical object, wherein the computer system is in communications with the group of unmanned vehicles using communications links;
receiving, by the computer system, scan data for a region of the physical object;
creating, by the computer system using the images and the scan data, an enhanced model of the physical object comprising a greater level of detail and granularity of data about the region than a level of detail and granularity of the region in a model of the physical object generated prior to the enhanced model, wherein the region in the enhanced model has greater detail than other regions of the physical object in the enhanced model;
updating, using a scan of a changed structure on the physical object, a model of the physical object generated prior to the enhanced model;
classifying nonconformances of the changed structure;
sending, by the computer system, at least a portion of the enhanced model to a portable computing device, wherein the portable computing device localizes to the physical object using at least the portion of the enhanced model; and
sending, by the computer system, the information that is displayable by the portable computing device, wherein the portable computing device displays the information on the live view of the physical object seen through the portable computing device, and wherein the information is identified using the enhanced model of the physical object for performing an operation on a nonconformance in the nonconformances.

20. The method of claim 19 further comprising:
the information comprising a health, remaining life, or suitability for use, of the physical object;
controlling, by the computer system, the group of unmanned vehicles to move relative to the physical object;

controlling the group of unmanned vehicles to generate the images of the physical object and scan data describing points in space for the region of the physical object.

21. The method of claim 19, wherein creating the enhanced model of the physical object using the images and the scan data comprises:
   electromagnetic, acoustic, or pressure scan data;
   creating the model of the physical object generated prior to the enhanced model using the images;
   creating a number of point clouds from scan data generated by a number of unmanned vehicles in the group of unmanned vehicles; and
   modifying the model of the physical object using the number of point clouds to form the enhanced model.

22. The method of claim 19, wherein the group of unmanned vehicles operates to generate the images and scan data while the portable computing device presents the live view of the physical object.

23. The method of claim 19 further comprising:
   selecting, by the computer system, the region of the physical object; and
   controlling, by the computer system, a number of unmanned vehicles in the group of unmanned vehicles to generate the scan data of the region of the physical object.

24. The method of claim 19, wherein selecting, by the computer system, the region of the physical object comprises:
   selecting, by the computer system, the region of the physical object using artificial intelligence.

25. The method of claim 19, wherein selecting, by the computer system, the region of the physical object comprises:
   selecting, by the computer system, the region of the physical object based on a location for a task performed using the portable computing device, wherein the location is encompassed by the region.

26. The method of claim 19 further comprising:
   receiving, by the computer system, at least one of additional images of the physical object or additional scan data of the physical object from the portable computing device;
   determining information comprising assessing: a health, a remaining life, or a suitability for use, of the physical object; and
   wherein creating, by the computer system, the enhanced model of the physical object using the images and the scan data comprises creating, by the computer system, the enhanced model of the physical object using the images, the additional images, the scan data, and the additional scan data.

27. The method of claim 19, wherein the information is selected from at least one of task information, an assembly, a video, an indication of a non-conformance, a work order, an exploded view of the assembly, or a schematic diagram.

28. The method of claim 19, wherein the physical object is selected from an airplane, a building, a bridge, a dam, a vehicle, a field, a lake, a mountain, an engine a fuselage section, and a runway.

29. The method of claim 19, wherein the portable computing device is selected from smart glasses, a mobile phone, a tablet computer, and a head-mounted display.

* * * * *